United States Patent [19]
Tsukamoto et al.

[11] Patent Number: 5,660,455
[45] Date of Patent: Aug. 26, 1997

[54] VEHICULAR HEADLAMP HAVING A TILT MEASURING DEVICE

[75] Inventors: Hironori Tsukamoto; Katutada Shirai, both of Shizuoka, Japan

[73] Assignee: Koito Manufacturing Co., Ltd., Tokyo, Japan

[21] Appl. No.: 380,791

[22] Filed: Jan. 30, 1995

[30] Foreign Application Priority Data

| Feb. 2, 1994 | [JP] | Japan | 6-011218 |
| Jan. 11, 1995 | [JP] | Japan | 7-002608 |

[51] Int. Cl.⁶ ............................................. B60Q 1/06
[52] U.S. Cl. ................... 362/66; 362/284; 362/428; 362/289; 33/288
[58] Field of Search .................. 362/61, 66, 80, 362/282, 284, 427, 428, 273, 418, 289, 419; 33/288, 335

[56] References Cited

U.S. PATENT DOCUMENTS

| 4,731,706 | 3/1988 | Ricard | 362/61 |
| 4,922,387 | 5/1990 | Ryder et al. | 362/61 |
| 5,063,480 | 11/1991 | McMahan et al. | 362/61 |
| 5,065,293 | 11/1991 | Mochizuki | 362/273 |
| 5,068,769 | 11/1991 | Umeda et al. | 362/61 |
| 5,077,642 | 12/1991 | Lisak | 362/66 |
| 5,150,958 | 9/1992 | Miyazawa et al. | 362/66 |
| 5,186,531 | 2/1993 | Ryder et al. | 362/66 |
| 5,197,794 | 3/1993 | Scott et al. | 362/66 |
| 5,197,799 | 3/1993 | Dehaene | 362/420 |
| 5,343,372 | 8/1994 | Shirai et al. | 362/66 |
| 5,351,170 | 9/1994 | Nagengast et al. | 362/66 |
| 5,365,415 | 11/1994 | Schmitt et al. | 362/66 |

*Primary Examiner*—Thomas M. Sember
*Attorney, Agent, or Firm*—Sughrue, Mion, Zinn, Macpeak & Seas.

[57] ABSTRACT

An automotive headlamp having a tilt measuring device for measuring an amount of horizontal tilt of a reflector is mounted between an aiming screw and a guide member extending parallel to the aiming screw. The aiming screw is supported by a lamp body. By turning (or moving back and forth) the aiming screw, the reflector is tilted in the horizontal direction. The tilt measuring device includes a slide member loosely coupled to the aiming screw and slidable along a guide member, a screw holding member functioning such that when the screw holding member grasps the aiming screw in proximity to the slide member, the sliding motion of the slide member is associated with the rotation (or the back and forth movement) of the aiming screw, and when the screw holding member is retracted to the side of the aiming screw, the coupling of the slide member with the aiming screw is released, a cursor provided on the slide member, and a scale provided on the guide member.

12 Claims, 17 Drawing Sheets

VEHICULAR HEADLAMP HAVING A TILT MEASURING DEVICE

BACKGROUND OF THE INVENTION

The present invention relates to a vehicular headlamp having a tilt measuring device for checking whether or not the aiming direction of a light beam from the vehicular headlamp, i.e., the beam angle of the headlamp, is correct, and if it is not correct, allowing the beam angle of the headlamp to be corrected in a simple manner.

In the description to follow, a headlamp of the reflector-movable type will be described in which the reflector is tiltably mounted within the lamp body. As shown in FIG. 27, the rear side of a reflector 202 is supported by a lamp body 201 at three points, namely, by two longitudinally extending aiming screws 203 and 204, and a pivot point 205. In FIG. 27 showing a plan view of the reflector, the two aiming screws 203 and 204 extend vertical to the surface of the paper. The two aiming screws 203 and 204 are rotatably supported on the rear side of the lamp body 201. The support points of the reflector 202 (nut members of the reflector forming aiming screw support members) are disposed orthogonal to each other with respect to the pivot point 205 when seen from the front of the lamp. By turning the two aiming screws 203 and 204, the reflector nut members threadedly joined to the two aiming screws 203 and 204 move back and forth along the two aiming screws 203 and 204, so that the reflector 202 turns about the horizontal axis Lx and the vertical axis Ly, thereby horizontally and vertically adjusting the angle of the output light beam of the lamp. Reference numeral 206 designates a bulb mounted on the reflector 202.

Published Unexamined Japanese Patent Application No. Hei. 5-290604 discloses a first conventional tilt measuring device. As shown in FIGS. 28 and 29, the measuring device is formed of a guide mhember 212, a-nut member 214, a zero-adjust plate 218, a cursor 218a formed on the zero-adjust plate 218, and a scale 212a formed on the guide member 212. The guide member 212 is fastened to the rear wall of the lamp body 201 and extends in parallel with the aiming screw 203. The nut member 214 opens at one side to be shaped like a "U" in cross section. The zero-adjust plate 218 is mounted on the nut member 214, and engages the guide member 212 so as to be slidable along the guide member 212.

The cursor 218a slides along the scale 212a when the aiming screw 203 is turned. When the reflector 202 has been positioned by a tilt adjustment (aiming adjustment) so as to render the beam angle of the headlamp proper, and the cursor 218a is set at the zero point on the scale 212a. (This operation will be referred to as a zero-point adjustment).

If later the tilt position of the reflector is somehow disturbed and the beam angle of the headlamp deviates from the correct angle, the cursor 218a will deviate from the zero point on the cursor 218a by a distance corresponding to the amount of deviation of the beam angle of the headlamp. With this construction, any person, skilled or unskilled, can easily carry out the aiming adjustment by merely turning the aiming screw 203 so as to remove the deviation of the cursor from the zero point on the scale (that is, to return the cursor 218a to the zero point on the scale 212a).

Published Unexamined Japanese Patent Application No. Hei. 4-198830 shows a second conventional tilt measuring device. As shown in FIGS. 30 to 33, the tilt measuring device is formed with a transparent case 220, a base member 222, a slide member 224, a coupling member 226, a reference line 221, and a scale 225. The transparent case 220 is mounted on a lamp body 201, enclosing an aiming screw 203. The base member 222, cylindrical in shape, is disposed within the transparent case 220 in a state such that it is rotatable with respect to the aiming screw 203. The slide member 224 is threadedly joined to a male threaded part 222a on the outer surface of the base member 222, and coupled with the transparent case 220 in a nonrotative fashion. The coupling member 226 is disposed between the base member 222 and the aiming screw 203, thereby coupling these components together. The reference line 221 is drawn on the transparent case 220. The scale 225 is formed on the slide member 224. With the structure of the tilt measuring device, the slide member 224 slides back and forth within the transparent case 220 when the aiming screw 203 is turned. The amount of deviation of the beam angle of the headlamp is indicated in the form of a corresponding amount of deviation of the reference line 221 from the zero point 225a on the scale. In FIG. 31, reference numeral 208 designates a screw support member of the reflector, which is threadedly joined with an aiming screw 204.

The tilt measuring device may take one of two states optionally, as shown in FIGS. 32 and 33. In a first state, the base member 222 is coupled with the aiming screw 203 (FIG. 33). The tips 227 of a pair of flexible pieces of the coupling member 226 are inserted into the concavities 223 of the base member 222, thereby to hold a rearward extending part 204 of the aiming screw 203 with the tips 227 (FIG. 33). The rear extended part 204 is rectangular in cross section. In a second state, the coupling member 226 is pulled out rearward (FIG. 32). Then, the tips 227 of the flexible pieces disengage from the concavities 223 of the base member 222, thereby to release the rearward extending part 204 of the aiming screw from being held (to disengage the base member 222 from the aiming screw 203). In this state, the aiming screw 203 may be turned independently of the base member 222.

In this second conventional device, in a state where the zero-point adjustment has been completed, the coupling member 226 is pulled out of the concavities 223 and the base member 222 is disengaged from the aiming screw 203. When an aiming adjustment is subsequently carried out, the reference line 221 remains placed exactly above the zero point 225a. Accordingly, there is no need of zero-point adjustment after the aiming adjustment.

The first conventional device is advantageous in that its construction is simple, but is disadvantageous in that the zero-point adjustment work is troublesome. That is, the zero-point adjustment is carried out in a complicated manner whereby a fixing screw 218b of the zero-adjust plate 218 is loosened, the zero-adjust plate 218 is slid with respect to the nut member 214, the zero-adjust plate 218 is properly positioned, and then the fixing screw 218b is tightened again.

In the second conventional device, when the coupling member 226 is pulled out to disengage the base member 222 from the aiming screw 203, and then the aiming adjustment is carried out, the reference line 221 remains placed just above the zero point 225a. Accordingly, no zero-point adjustment must follow the aiming adjustment.

In this respect, the second conventional device is very advantageous. However, the second conventional device is disadvantageous in that the number of parts required is large, which makes the structure of the resultant tilt measuring device complicated, and the assembly of the device to the headlamp is made correspondingly complicated.

SUMMARY OF THE INVENTION

The present invention has been made in view of the above circumstances, and has as an object the provision of a vehicular headlamp having a tilt measuring device which requires a reduced number of parts, and has a simple construction, and in which the zero-point adjustment following the aiming adjustment can be carried out in a simple manner.

Another object of the present invention is to provide a vehicular headlamp having a tilt measuring device which requires a reduced number of parts, has a simple construction, and requires no zero-point adjustment following the aiming adjustment.

To achieve the above and other objects, there is provided an improved tilt measuring device for use with a headlamp for automobiles. The headlamp is of the tiltable-member type in which a tiltable member with a reflecting surface for determining the aiming direction of the light beam from the headlamp is supported at three points, i.e., by a pivot point provided between the tiltable member and a base member, a horizontal aiming screw, and a vertical aiming screw. The tilt angle of the tiltable member is adjusted by rotation of the aiming screws, whereupon screw support members of the tiltable member threadedly joined to the aiming screws move back and forth along the aiming screws. Alternately, by turning nut members rotatably supported by bearings on the base member, the aiming screws, which in this case are threadedly joined to the nut members and coupled to the base member in an nonrotative manner, axially move back and forth, together with the screw support members of the tiltable member. In either case, the tiltable member is tilted vertically and horizontally with respect to the base member, and hence the aiming angle of the headlamp is adjusted.

The base member is provided with a guide member extending substantially parallel to the horizontal aiming screw, and the tilt measuring device is mounted between the horizontal aiming screw and the guide member for measuring the amount of horizontal tilt of the tiltable member. In accordance with the invention, the tilt measuring device includes a slide member loosely coupled to the aiming screw and slidable in the direction in which the guide member extends, a screw holding member functioning such that when the screw holding member directly or indirectly grasps the aiming screw in proximity to the slide member, the sliding motion of the slide member is associated with the turning or the back and forth movement of the aiming screw, and when the screw holding member is retracted to the side of the aiming screw, the coupling of the slide member with the aiming screw is released, and a relative scale provided between the slide member and the guide member or between the screw holding member and the guide member.

In the tilt measuring device thus constructed, concave/convex resilient stopper is provided between the slide member and the guide member, or between the screw holding member and the guide member. The resilient stopper operates such that in the state where the coupling of the slide member with the aiming screw is released, the concave/convex resilient stopper temporarily holds the slide member at a predetermined position (as viewed in the sliding direction) where the zero point on the relative scale is indicated, and in the state where the slide member is coupled to the aiming screw, the concave/convex resilient stopper allows the slide member to slide along the guide member in association with the turn of the aiming screw.

The aiming mechanism for vehicular headlamps can be classified into first and second types. In the first type of aiming mechanism, the screw support members of the tiltable member are threadedly joined to the aiming screws rotatably supported by the base member. By turning the aiming screws, the screw support members of the tiltable member move back and forth along the aiming screws, thereby tilting the tiltable member with respect to the base member (i.e., the tiltable member is turned about the tilt center axes). In the second type of aiming mechanism, by turning nut members rotatably supported by bearings on the base member, the aiming screws threadedly joined to the nut members and coupled to the base member in an nonrotative manner axially move back and forth, whereby the tiltable member is tilted with respect to the base member (i.e., the tiltable member is turned about the tilt center axes).

In either type of aiming mechanism, in the state where the screw holding member of the tilt measuring device directly or indirectly grasps the aiming screw (the sliding motion of the slide member is associated with the turn of the aiming screw), the amount of tilt of the tiltable member relative to the base member that is caused by the turning of the aiming screw is proportional to the amount of movement of the slide member relative to the guide member. Accordingly, the amount of tilt of the tiltable member relative to the base member, i.e., the amount of a horizontal deviation of the beam angle of the headlamp, is indicated in the form of a change on the scale provided between the slide member (or the screw holding member) and the guide member. A change on the scale shows whether or not the horizontal beam angle of the headlamp is proper. If it is not proper, the amount of deviation of the beam angle is indicated by the change on the scale.

To correct the deviation of the horizontal beam angle, the tiltable member is tilted for adjustment (this adjustment is referred to as an aiming adjustment). For the aiming adjustment, in the first type of aiming mechanism, the aiming screw is turned to move the screw support members of the tiltable member back and forth. In the second type of aiming mechanism, the nut member is turned to move the aiming screw back and forth.

The state where the screw holding member of the tilt measuring device is retracted to the side of the aiming screw and the slide member is not affected by the turning (or the forward and backward movement) of the aiming screw, i.e., a state where the coupling of the slide member with the aiming screw is released, is established. In this state, the aiming adjustment is carried out. Thereafter, the slide member is slid to a predetermined position (the zero-point on the relative scale provided between the slide member and the guide member or the screw holding member and the guide member) along the guide member. At this position, the screw holding member grasps the aiming screw (the slide member is coupled to the aiming screw). In this state, the tilt measuring device is ready for measurement.

The engaging position of the concave/convex resilient stopper, which is provided between the slide member and the guide member, or between the screw holding member and the guide member, is coincident with the zero-point position. Therefore, when the slide member loosely coupled to the aiming screw is moved along the aiming screw to establish the engagement of the concave/convex resilient stopper, the zero point on the relative scale provided between the slide member (screw holding member) and the guide member is automatically indicated.

In the state where the coupling of the slide member with the aiming screw is released, if the zero point is indicated on the relative scale by the concave/convex resilient stopper, which is provided between the slide member and the guide member (or the screw holding member and the guide member), the rotation (or the forward and backward movement) of the aiming screw is little transferred to the slide member since the slide member is not coupled to the aiming screw. Further, the elastic urging force of the concave/convex resilient stopper holds the slide member at a predetermined engaging position. Therefore, in this state (where the coupling of the slide member with the aiming screw is released and the zero-point adjustment has been effected), when an aiming adjustment is carried out, the indication of the zero point on the scale is maintained.

In the state where the slide member is coupled to the aiming screw, the engaging force of the concave/convex resilient stopper acting to resiliently hold the slide member at a predetermined position (corresponding to the zero-point position on the scale) is not so strong as to hinder the forward and backward movement of the slide member, which is associated with the rotation (i.e., either rotation during an aiming adjustment or unwanted rotation caused by vibration, for example) of the aiming screw (or the nut member). Accordingly, there is no chance that the engaging force will hinder the measuring operation of the tilt measuring device (the forward and backward movement of the slide member through a distance proportional to the quantity of a tilt of the tiltable member).

BRIEF DESCRIPTION OF THE DRAWINGS

Other objects, features, and advantages of the present invention will be apparent in consideration of the following description in connection with the accompanying drawings, in which:

FIGS. 23 and 24 show front views of the tilt measuring device, of which FIG. 23 shows a slide member coupled to an aiming screw when a screw holding member holds a male threaded part of the aiming screw, and FIG. 24 shows the state where the screw holding member disengages from the male threaded part, and the slide member is decoupled from the aiming screw;

DESCRIPTION OF THE PREFERRED EMBODIMENTS

Preferred embodiments of a tilt measuring device according to the present invention will be described with reference to the accompanying drawings.

Figure 1:
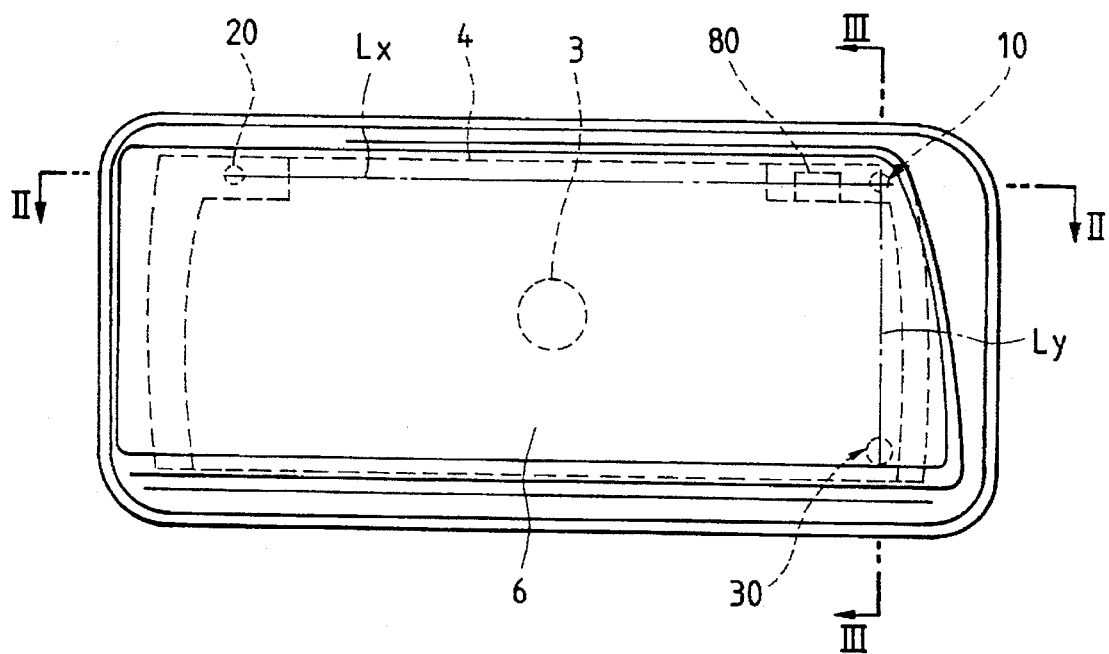
FIG. 1 is a front view showing a headlamp for motor vehicles utilizing a tilt measuring device of the invention.
Figure 2:
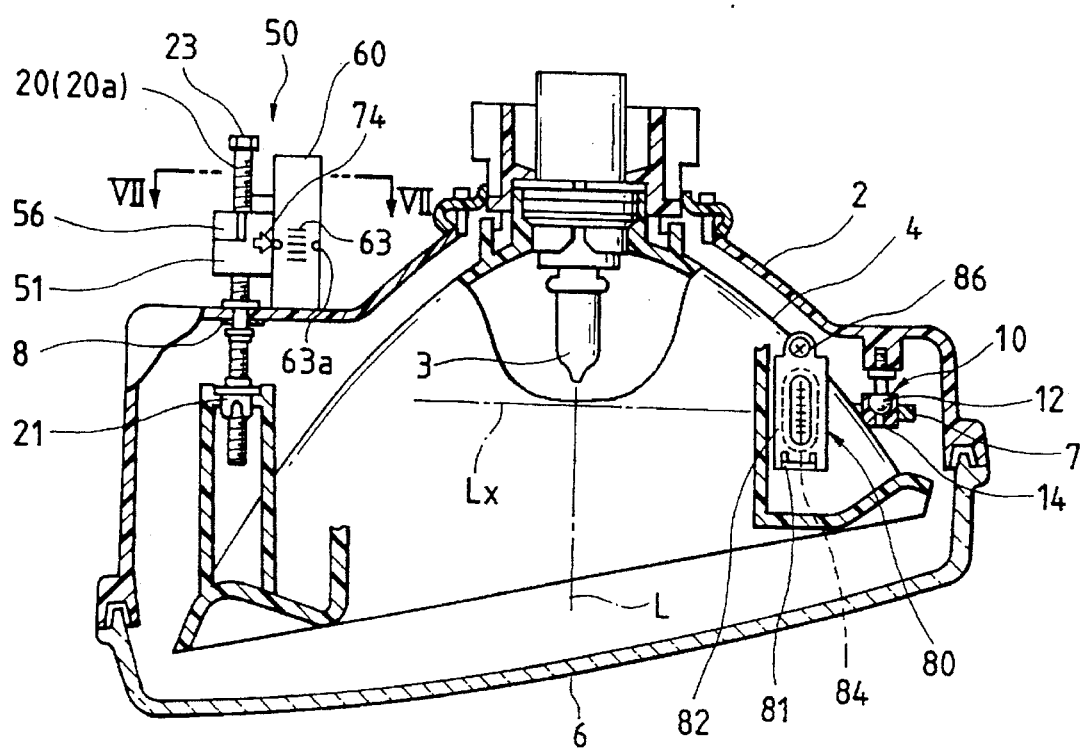
FIG. 2 is a horizontal cross-sectional view showing the headlamp of FIG. 1 (cross-sectional view taken on line II—II in FIG. 1)
Figure 3:
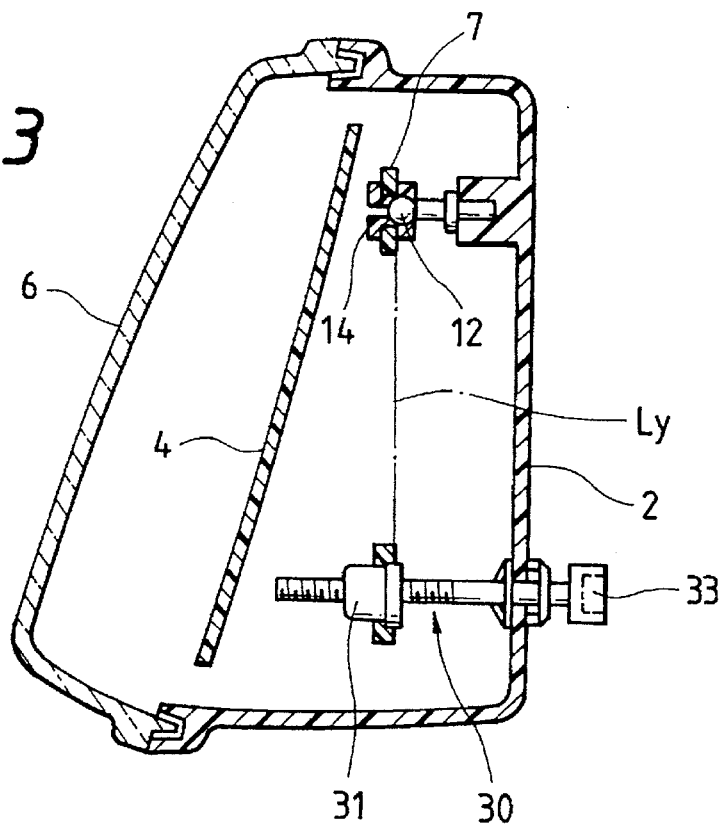
FIG. 3 is a longitudinal sectional view showing the headlamp of FIG. 1 (cross-sectional view taken on line III—III in FIG. 1)
Figure 4:
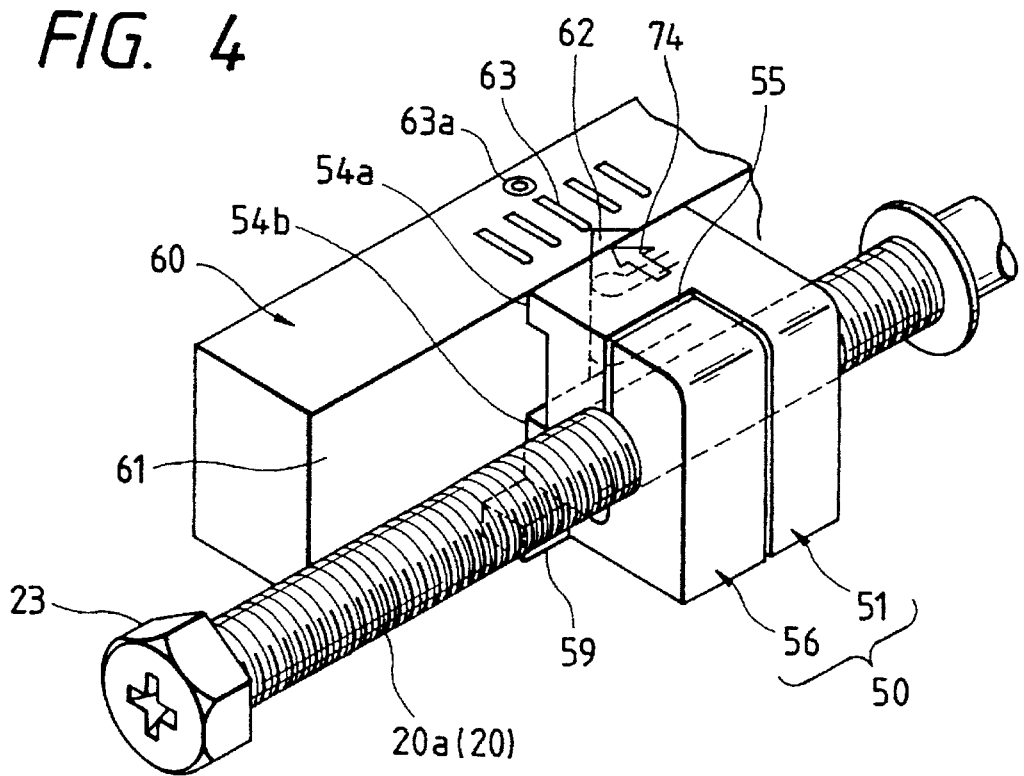
FIG. 4 is a perspective view showing a tilt measuring device for measuring the amount of inclination of a light beam emitted by the headlamp in the horizontal direction.
Figure 5:
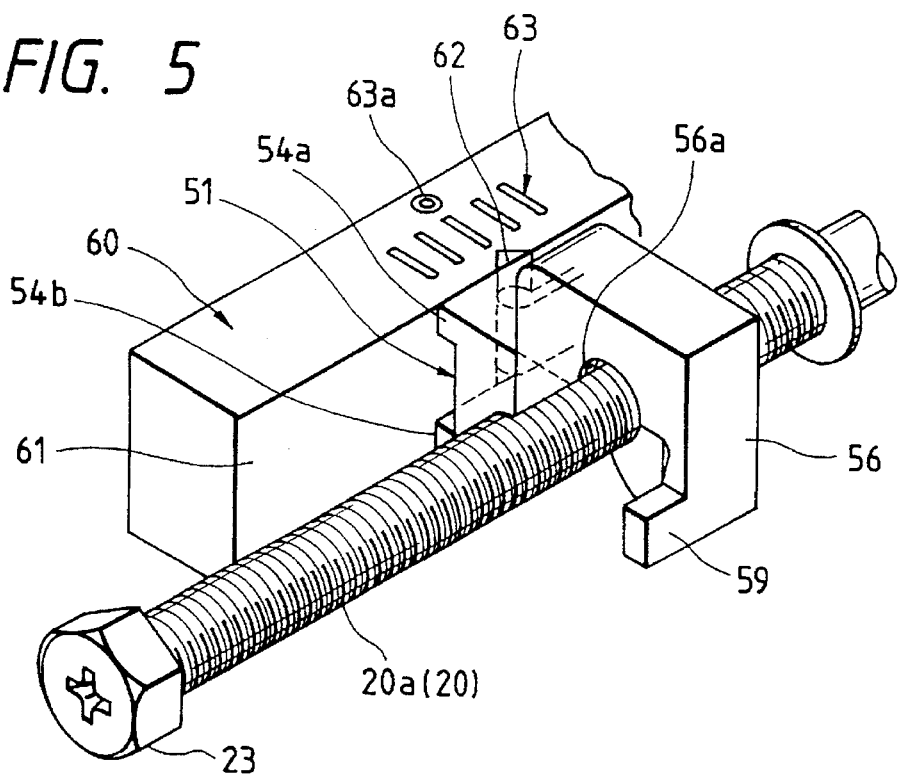
FIG. 5 is a perspective view showing a tilt measuring device for measuring the amount of inclination of a light beam emitted by the headlamp in the horizontal direction.
Figure 6:
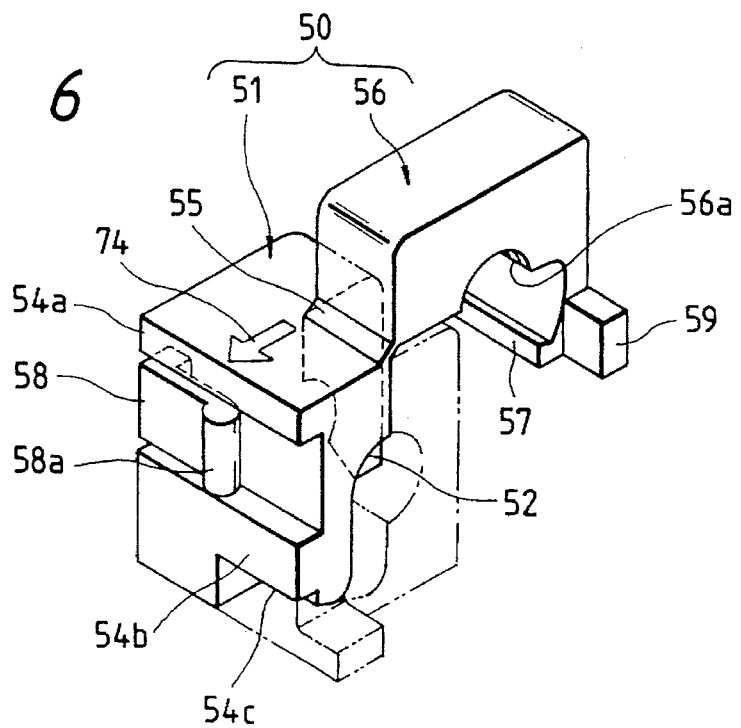
FIG. 6 is a perspective view showing a tilt measuring device for measuring the amount of inclination of a light beam emitted by the headlamp in the horizontal direction.
Figure 7:
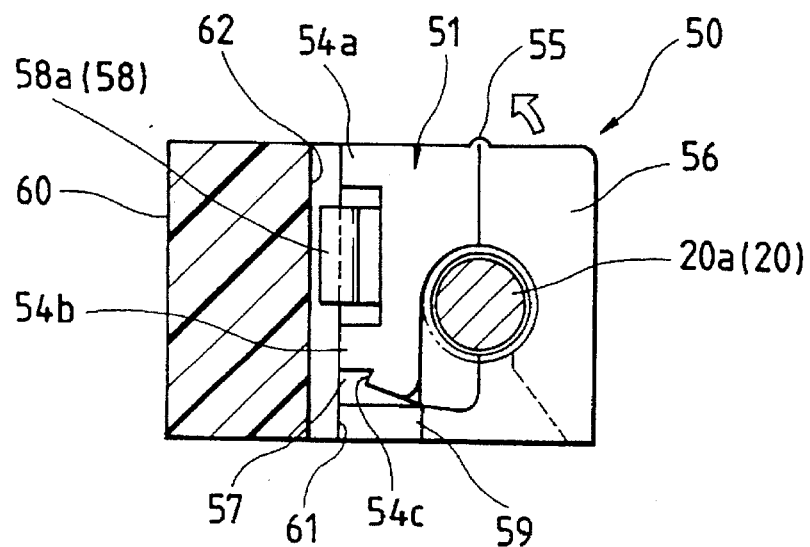
FIG. 7 is a side elevational view, partly in cross section, of a tilt measuring device illustrating the manner in which a screw holding member holds an aiming screw male threaded part and a slide member interlocks with an aiming screw.
Figure 8:
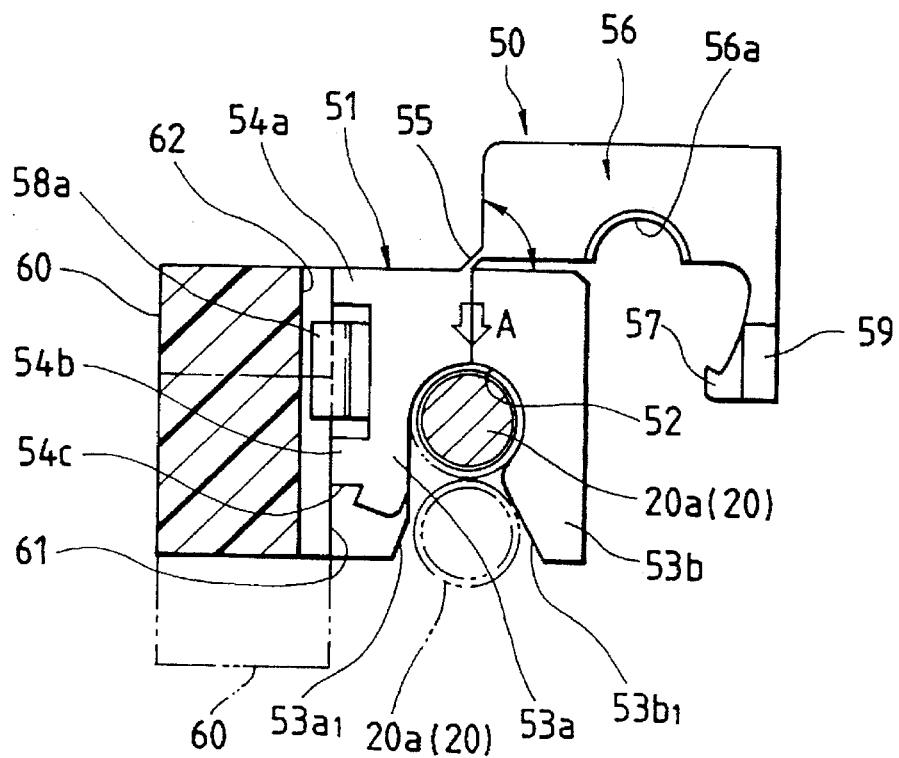
FIG. 8 is a side elevational view, partly in cross section, of a tilt measuring device showing the manner in which the screw holding member disengages from the aiming screw male threaded part and the interlocking of the slide member with the aiming screw is released.
Figure 9:
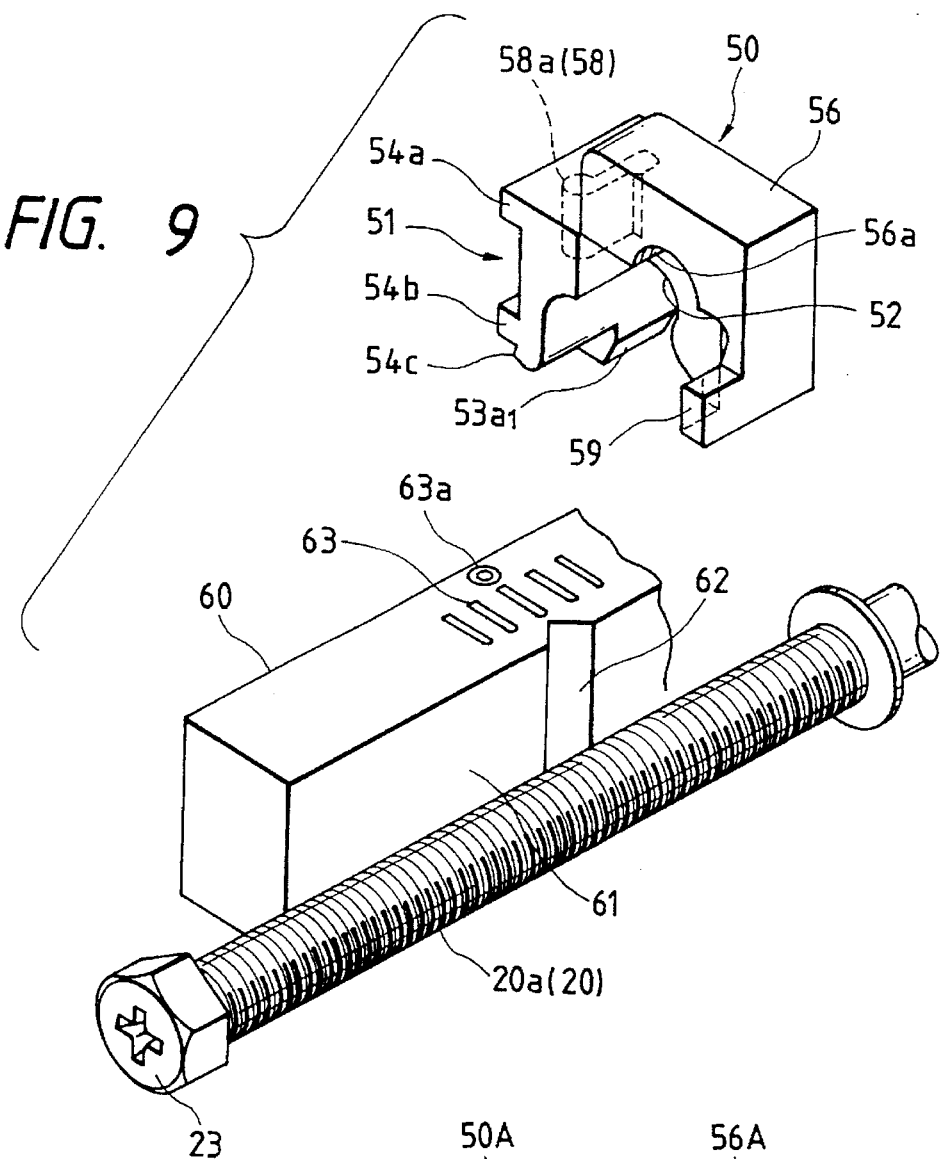
FIG. 9 is a perspective view showing how the tilt measuring device is assembled to the headlamp.
Figure 18:
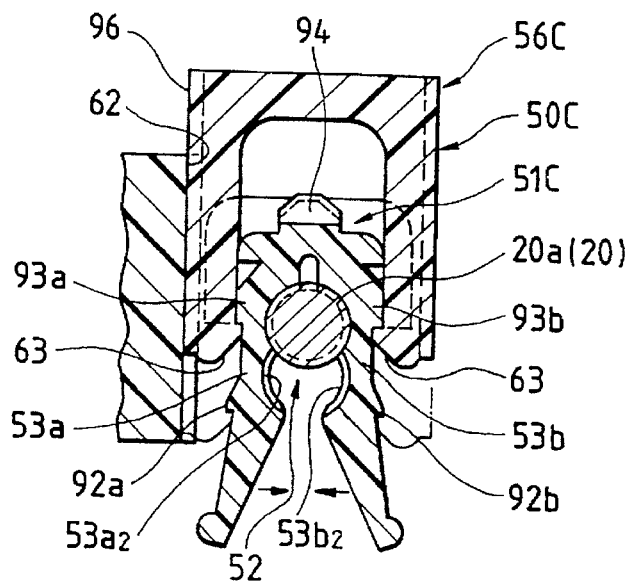
FIG. 18 is a transverse sectional view of the tilt measuring device of FIG. 16, the illustration showing the state where the coupling of the slide member with the aiming screw is released.

FIGS. 1 through 9 show an embodiment in which the present invention is incorporated into a headlamp of the movable-reflector type in which the base member is a lamp body and the tiltable member is a reflector. Of these figures, FIG. 1 is a front view showing the headlamp of the movable-reflector type into which a tilt measuring device is assembled. FIG. 2 is a horizontal cross-sectional view showing the headlamp. (cross-sectional view taken on line II—II in FIG. 1). FIG. 3 is a longitudinal sectional view showing the headlamp cross-sectional view taken on line III—III in FIG. 1). FIGS. 4 to 6 are perspective views showing a tilt measuring device for measuring an inclination of a light beam emitted by the headlamp in the horizontal direction (cross-sectional view taken on line VII—VII in FIG. 2). FIG. 7 is a side elevational view, partly in cross section, of the tilt measuring device in which a screw holding member holds an aiming screw male threaded part and a slide member interlocks with an aiming screw. FIG. 18 is a side elevational view, partly in cross section, of the tilt measuring device in which the screw holding member is disengaged from the aiming screw male threaded part and the interlocking of the slide member with the aiming screw is released. FIG. 9 is a perspective view showing how the tilt measuring device is assembled into the headlamp.

In these figures, reference numeral 2 designates a capsule-shaped lamp body forming base member. A parabolically shaped reflector 4, which is a tiltable member, is disposed within the lamp body 2. A bulb 3, which is the light source for the headlamp, is inserted into the reflector 4. A front lens 6 is fitted over the front opening of the lamp body 2, thereby closing the headlamp.

Within the lamp body 2, the reflector 4 is supported at three positions, namely, by a ball joint 10, a horizontal aiming screw 20, and a vertical aiming screw 30 (FIGS. 1 to 3). A ball 12 of the ball joint 10 is fixed to the lamp body 2. A ball receiving socket 14 for receiving the ball 12 is inserted into a bracket 7 protruding rearward of the reflector 4 and fixed thereto. The reflector 4 is tiltable about the ball joint 10. The aiming screws 20 and 30, which are made of metal or synthetic resin, pass through the lamp body 2 and are rotatably supported by push-on fixing portions 8 of the lamp body. The forward parts of the aiming screws 20 and 30, which extend forward of the lamp body 2, are screwed into screw support nuts 21 and 31, the latter acting as screw support means for the reflector 4. The ends of the rearward parts of the aiming screws 20 and 30, which extend rearward of the lamp body 2, are respectively provided with tool engaging parts 23 and 33 with which a tool, such as a screwdriver, can be engaged. When the aiming screws 20 and 30 are turned, the screw support nuts 21 and 31 move back and forth along the aiming screws 20 and 30, thereby tilting the reflector 4 for adjustment.

The support point of the reflector 4 by the horizontal aiming screw 20 (i.e., the point where the aiming screw 20 is screwed into the screw support nut 21) lies on a horizontal axis Lx which passes through the ball joint 10 and is orthogonal to the beam axis L (FIG. 2) of the headlamp. The support point of the reflector 4 by the vertical aiming screw 30 (the point where the vertical aiming screw 30 is screwed into the screw support nut 31) lies on a vertical axis Ly which passes through the ball joint 10 and is orthogonal to the horizontal axis Lx.

With the support of the reflector 4 at these support points, when the horizontal aiming screw 20 is turned, the screw support nut 21 moves back and forth along the horizontal aiming screw 20, so that the reflector 4 is tilted about the vertical axis Ly. Accordingly, the amount of inclination of the reflector 4 relative to the lamp body 2, i.e., the amount of inclination of the tiltable member with respect to the base member, and hence the beam angle of the headlamp, can be adjusted in the horizontal direction.

When the horizontal aiming screw 30 is turned, the screw support nut 31 moves back and forth along the horizontal aiming screw 30 so that the reflector 4 is tilted about the horizontal axis Lx orthogonal to the vertical axis Ly. Accordingly, the inclination of the reflector 4 as a tiltable member with respect to the lamp body 2 as a base member, i.e., the beam angle of the headlamp, can be adjusted in the vertical direction. Thus, the tilt angle of the reflector 4, i.e., a beam angle of the headlamp, can be adjusted by means of the horizontal aiming screws 20 and 30.

In FIGS. 2 and 4 to 9, reference numeral 20a designates a male threaded part formed on the rearward part of the horizontal aiming screw 20, which extends rearward of the lamp body 2. A guide member 60 is fixed to the rear wall of the lamp body 2. The guide member 60, shaped like an "L" in cross section, extends parallel to the male threaded part 20a of the aiming screw. Reference numeral 50 designates a first tilt measuring device for measuring the amount of tilt of the reflector 4 in the horizontal direction, i.e., the beam angle of the headlamp in the horizontal direction. The first tilt measuring device 50 is located between the screw threaded part 20a of the aiming screw and the guide member 60.

The first tilt measuring device 50 is formed with a slide member 51, a screw holding member 56, and a relative scale (combination of a cursor 74 and a linear scale 63). The slide member 51, shaped like an "L" in plan and like a "U" in front view, is loosely coupled to the aiming screw male threaded part 20a, and slidable with respect to the guide member 60. The screw holding member 56, rectangular in shape, includes a female threaded part 56a, which is sized to mesh with the male threaded part 20a, and a thin hinge 55. The screw holding member 56 is integrally coupled to the slide member 51, with the thin hinge 55 therebetween. The relative scale is provided between the slide member 51 and the guide member 60. In the state where the female threaded part 56a of the screw holding member 56 receives the male threaded part 20a of the aiming screws, the amount of horizontal tilt of the reflector 4 (the amount of tilt of the reflector 4 about vertical axis Ly) is indicated in the form of a quantity of the movement of the cursor 74 along the slide member 51. When the cursor 74 is previously set to a zero point 63a on the linear scale 63 (this operation is referred to as a zero-point adjustment), the indication by the cursor 74 on the scale represents the amount of horizontal tilt of the reflector 4.

The slide member 51 and the screw holding member 56 are formed by molding synthetic resin, such as nylon or ABS, in a one-piece construction. The slide member 51 and the screw holding member 56 may be turned about the thin hinge 55, which interconnects these members 51 and 56 (an arrow in FIG. 8). A hole 52, partly circular in cross section and opening downward, is formed between the opposed side walls 53a and 53b (FIG. 8) of the slide member 51. The diameter of the circular hole 52 is larger than the diameter of the aiming screw male threaded part 20a. The circular hole 52 has a downward opening of which the width is somewhat smaller than the outer diameter of the circular hole 52. Through the opening, the male threaded part 20a of the aiming screw is introduced into the circular hole 52. To be more specific, to introduce the male threaded part 20a into the circular hole 52, slanted faces 53a1 and 53b1 occupying the lower parts of the side walls 53a and 53b are brought into contact with the male threaded part 20a of the aiming screw, as indicated by phantom lines in FIG. 8. Then, the slide member 51 is pressed against the male threaded part 20a of the aiming screw (in the direction of an arrow A in FIG. 8). As a result, the side walls 53a and 53b are elastically moved outward, so that the male threaded part 20a of the aiming screw is loosely received in the circular hole 52. The side wall 53a of the slide member 51 extends in the longitudinal direction of the circular hole 52 (in the direction vertical to the paper surface in FIGS. 7 and 8) to a length longer than that of the other side wall 53b. A pair of horizontal guides 54a and 54b are formed on the outer side of the side wall 53a. The horizontal guides 54a and 54b slidably contact the side surface 61 of the guide member 60. With this structure, the slide member 51 may slide along the guide member 60 while being loosely coupled to the aiming screw male threaded part 20a of the aiming screw.

The screw holding member 56 has substantially the same shape as that of the shorter side wall 53b. The female threaded part 56a of the screw holding member 56 is formed at a location thereof in opposition to the circular hole 52 of the side wall 53a. A resilient hook 57 is formed at the lower end of the screw holding member 56. The resilient hook 57 engages an inward curved part 54c of the lower end of the side wall 53a of the slide member 51. When the resilient hook 57 is put in the inward curved part 54c, the screw holding member 56 holds the male threaded part 20a of the aiming screws. In this state, the female threaded part 56a of the screw holding member 56 is in mesh with the male threaded part 20a of the aiming screw. More specifically, in the state where the resilient hook 57 is received in the inward curved part 54c and the screw holding member 56 grasps the male threaded part 20a (the female threaded part 56a of the screw holding member 56 is in mesh with the male threaded part 20a), the horizontal guides 54a and 54b come in contact with the guide member 60, thereby to prevent the turning of the slide member 51. Under this condition, the slide member 51 slides a distance corresponding to the amount of rotation of the horizontal aiming screw 20 along the guide member 60 in association with the turning of the horizontal aiming screw 20.

Reference numeral 58 designates a resilient engaging plate, shaped like a plate spring, which extends from the side wall 53a of the slide member 51 and parallel to the same. In the state where the male threaded part 20a of the aiming screw is loosely coupled to the circular hole 52 of the slide member 51, the expanded tip 58a of the resilient engaging plate 58 is urged into contact with the side surface 61 of the guide member 60. At a position where the expanded tip 58a is received in a vertical groove 62 of the guide member 60, the cursor 74 indicates the zero point 63a on the scale. By inserting the expanded tip 58a in the vertical groove 62, the slide member 51 is temporarily held at this position, i.e., the zero point on the scale. Reference numeral 59 designates a knob protruding forward of the front end of the screw holding member 56. The knob 59 is used for manually operating the screw holding member 56.

An initial stress tending to turn the screw holding member 56 counterclockwise in FIG. 7 (in the direction of an arrow) exists in the thin hinge 55. In molding the slide member 51 and the screw holding member 56 in one-piece construction, the thin hinge 55 is molded in a straightened state, as indicated by a solid line in FIG. 8. When the resilient hook 57 grasps the inward curved part 54c, the thin hinge 55 is bent, and hence a stress to restore the bent thin hinge to its original state is generated. When the resilient hook 57 is disengaged from the inward curved part 54c, the screw holding member 56 turns about the thin hinge 55 due to the righting force of the hinge, so that the screw holding member 56 is placed in a sprung-up state as shown in FIG. 8. Accordingly, the screw holding member 56 may easily be disengaged from the male threaded part 20a of the aiming screw (the coupling of the slide member 51 with the horizontal aiming screw 20 is released) by disengaging the resilient hook 57 from the inward curved part 54c by manually moving the knob 59, or with a tool for turning the aiming screw.

The aiming adjustment and the zero-point adjustment of the first tilt measuring device 50 are carried out in the following manner.

The state as shown in FIG. 7, in which the screw holding member 56 is in mesh with the aiming screw male threaded part 20a and the slide member 51 interlocks with the horizontal aiming screw 20, is changed to the state as shown in FIG. 8, in which the screw holding member 56 is in a sprung-up state. Then, the slide member 51 is disengaged from the male threaded part 20a of the aiming screw. Subsequently, the slide member 51 (and the screw holding member 56) is slid along the guide member 60 thereby to engage the expanded tip 58a of the resilient engaging plate 58 with the vertical groove 62. Then, the cursor 74 is automatically set to the zero point 63a. In this way, the zero-point adjustment is carried out.

Following the zero-point adjustment, the aiming adjustment is carried out by turning the horizontal aiming screw 20. In this case, the turning of the horizontal aiming screw 20 has little influence on the slide member 51 because the slide member 51 is not coupled to the horizontal aiming screw 20. By employing the resilient engaging plate 58 (more exactly, the expanded tip 58a thereof) as a concave/convex resilient stopper in the vertical groove 62, the slide member 51 is fixedly set at the zero point on the scale (where the cursor 74 indicates the zero point 63a). Therefore, the aiming adjustment can be carried out without disturbing the state of the zero-point adjustment already established.

After the aiming adjustment has been completed, the screw holding member 56 is turned about the hinge 55 thereby to engage the resilient hook 57 with the inward curved part 54c. The screw holding member 56 grasps the male threaded part 20a of the aiming screw (the female threaded part 56a is in mesh with the aiming screw male threaded part 20a). Consequently, the turning of the horizontal aiming screw 20 is associated with the sliding operation of the slide member 51 in such a manner that the deviation of the beam angle of the headlamp can be detected.

In this state where the slide member 51 is coupled to the horizontal aiming screw 20, the slide member 51 may be slid by turning the aiming screw 20, while resisting the holding force of the concave/convex resilient stopper (the engagement of the resilient engaging plate 58 with the vertical groove 62). Therefore, the tilt measuring device exactly indicates the amount of horizontal deviation of the beam angle of the headlamp. In other words, if the reflector 4 is tilted owing to vibration, for example, the tilting of the reflector 4 causes the aiming screw 20 to turn with respect to the screw support nut 21. With the turning of the aiming screw 20, the screw holding member 56 moves along the male threaded part 20a of the aiming screw. That is, the slide member 51 slides along the guide member 60 a distance corresponding exactly to the amount of tilt of the reflector 4. The sliding distance is indicated in the form of a deviation of the indication on the scale (the scale mark indicated by the cursor 74).

To couple the first tilt measuring device 50 to the aiming screw 20, the slide member 51 is applied to the aiming screw male threaded part 20a from above the male threaded part 20a. More exactly, in the state where the opening side of the slide member 51 is faced down while the screw holding member 56 is in a sprung-up state, the male threaded part 20a of the aiming screw is inserted into the circular hole 52 along the slanted faces 53a 1 and 53b 1 for aiming screw introduction. In this way, the male threaded part 20a of the aiming screw is loosely coupled to circular hole 52. Subsequently, the slide member 51 is slid along the guide member 60, thereby to engage the expanded tip 58a of the resilient engaging plate 58 with the vertical groove 62 of the guide member 60. Then, the slide member 51 is automatically set and held at the position where the zero-point adjustment has been made.

The male threaded part 20a of the aiming screw may be inserted into the circular hole 52 in the state where the expanded tip 58a of the resilient engaging plate 58 is positioned at the vertical groove 62. By doing so, the zero-point adjustment is made when the slide member 51 is loosely coupled to the aiming screw 20.

In FIGS. 1 and 2, reference numeral 80 designates a tilt measuring device of the bubble vial type for measuring the amount of horizontal tilt of the reflector 4, i.e., the horizontal tilt of the beam angle of the headlamp. The tilt measuring device 80 of the bubble vial type is formed with a capsule-shaped casing 81, which is mounted on the upper wall of the reflector 4 and opens upward, a cover 82 supported by the casing 81 such that it is rotatable about the horizontal axis Lx, and a linear bubble vial 84 that is contained in the casing 81 while being suspended from the cover 82. Reference numeral 86 designates an adjusting screw for the zero-point adjustment of the linear bubble vial 84.

Figure 10:
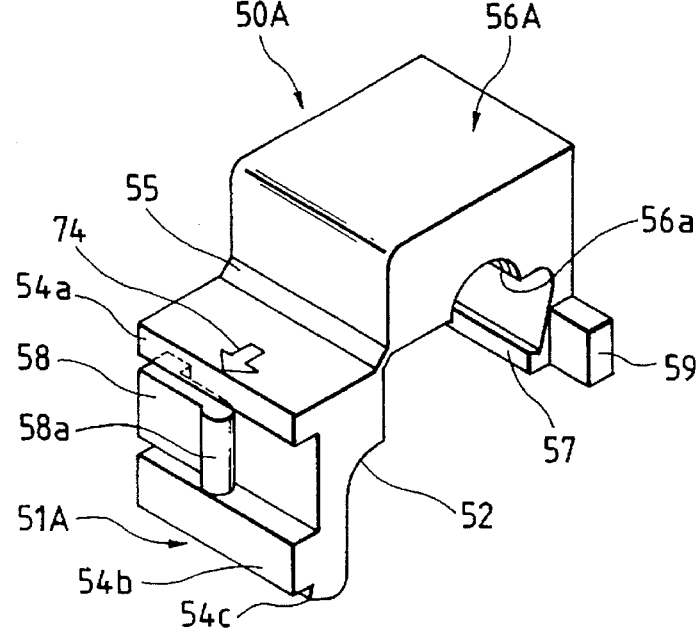
FIG. 10 is a perspective view showing a tilt measuring device according to a second embodiment of the present invention.

FIG. 10 is a perspective view showing a tilt measuring device according to a second embodiment of the present invention.

In the tilt measuring device 50 of the first embodiment, approximately one-fourth of the U-shaped block is separately formed. This one-fourth portion screw holding me used for the screw holding member 56. In the tilt measuring device 50A of the second embodiment, the U-shaped block is longitudinally divided into two sub-blocks along the circular hole. These divided sub-blocks are used for a slide member 51A with a smooth circular hole 52 and a screw holding member 56A with a female threaded part 56a.

The remaining construction of the second embodiment is substantially the same as that of the first embodiment. Hence, no further description of it will be given, noting that like reference numerals are used to designate like or equivalent portions.

Figure 11:
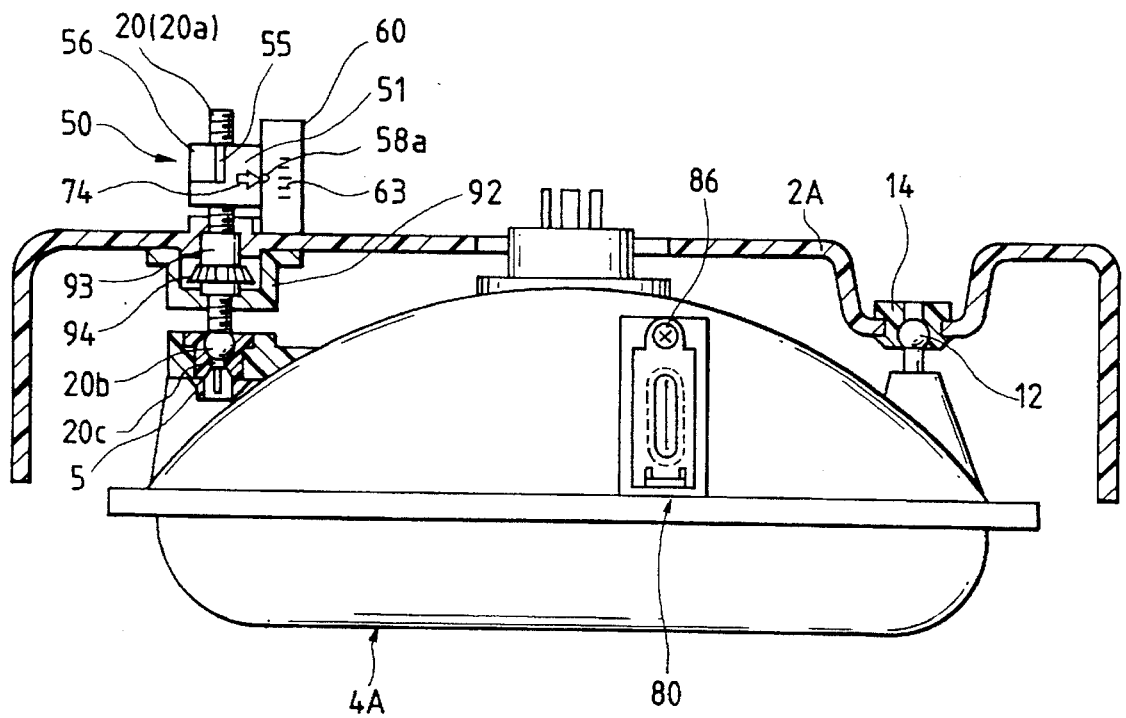
FIG. 11 is a plan view, partly in cross section, showing a headlamp for motor vehicles in which an aiming mechanism of a third embodiment of the invention is illustrated in cross section.
Figure 12:
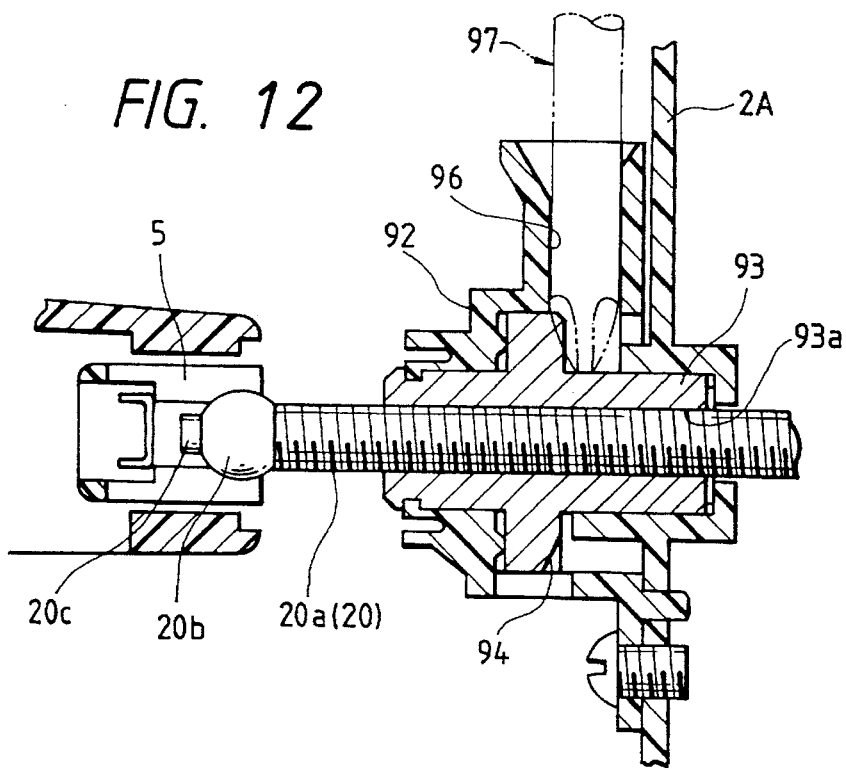
FIG. 12 is an enlarged, longitudinal sectional view showing the aiming mechanism of FIG. 11.

FIGS. 11 and 12 show a third embodiment of the present invention. Of these figure, FIG. 11 is a plan view, partly in cross section, showing a headlamp for motor vehicles in which an aiming mechanism is illustrated in cross section (FIG. 11 corresponds to FIG. 2 of the first embodiment). FIG. 12 is an enlarged, longitudinal sectional view showing the aiming mechanism.

In the above two embodiments, the present invention is applied to a headlamp of the movable-reflector type in which the reflector 4 (tiltable member) is tiltably supported by the lamp body 2 (base member). The aiming mechanism for tiltably supporting the reflector 4 has a structure such that by turning the aiming screw 20 rotatably supported by the lamp body 2, the screw support nut 21 mounted on the reflector 4 moves back and forth, thereby to tilt the reflector 4.

In the present embodiment, the present invention is applied to a headlamp of the movable-unit type in which a combined lamp body and reflector unit (referred to simply as a unit) is a tiltable member which is tiltably supported by a lamp housing 2A acting as a base member. In the unit 4A, the reflector is integrally formed on the inner surface of the lamp body.

The aiming mechanism for tiltably supporting the unit 4A has the following structure. A nut member 93 with a bevel gear 94 is rotatably supported by a bearing 92 of the lamp housing 2A. The aiming screw 20 (male threaded part 20a) is in mesh with a female threaded part 93a of the nut member 93. The ball end 20b of the aiming screw 20 is supported in an nonrotative fashion by a ball receiving member 5 mounted on the rear side bracket of the unit 4A. By turning the nut member 93, the aiming screw 20 moves back and forth, so that the unit 4A is horizontally tilted. Reference numeral 20c designates an engaging protrusion, rectangular in cross section, which protrudes from the ball end 20b. The engaging protrusion 20c is inserted into the ball receiving member 5, so that the opposed side walls of the ball receiving member 5 hold the engaging protrusion 20c thereby to prevent it from being turned.

A first tilt measuring device 50, which is the same as that in the first embodiment, is coupled to the aiming screw 20 (more exactly, the male threaded part 20a) protruding rearward of the lamp housing 2A. In the state where the screw holding member 56 holds the male threaded part 20a of the aiming screw (the slide member 51 is coupled to the aiming screw 20), by turning the nut member 93, the slide member 51 (and the screw holding member 56), together with the aiming screw 20, moves back and forth (along the guide member 60). Accordingly, the cursor 74 moves along the linear scale 63. Thus, the cursor 74 moves along the linear scale 63 by an amount proportional to the back and forth movement of the aiming screw 20 (the amount of horizontal tilting of the unit 4A).

In the state where the screw holding member 56 is disengaged from the male threaded part 20a of the aiming screw 20 (the coupling of the slide member 51 with the aiming screw 20 is released), the expanded tip 58a of the slide member 51 engages the vertical groove 62 of the guide member 60, whereby the slide member 51 is urged to the zero point on the scale. With the aid of this urging action, the slide member 51 (and the screw holding member 56) is set at a predetermined position without influence by the forward and backward movement of the aiming screw 20.

In FIG. 12, reference numeral 96 designates a vertical hole formed in the bearing 92. The vertical hole 96 receives a driver applied externally. To move the aiming screw 20 back and forth, a screwdriver 97 is inserted into this hole 96 until the tip of the driver engages the bevel gear 94 of the nut member 93. In this state, the driver 97 is turned. When the screwdriver 97 is turned, the nut member 93 turns, thereby to move the aiming screw 20 back and forth.

The remaining construction of the third embodiment is the same as in the first embodiment. Accordingly, like reference numerals are applied to like or equivalent portions, and no further description thereof will be given. For details of the aiming mechanism structure shown in FIGS. 11 and 12, reference is made to Published Unexamined Japanese Patent Application No. Hei. 5-334557.

Figure 13:
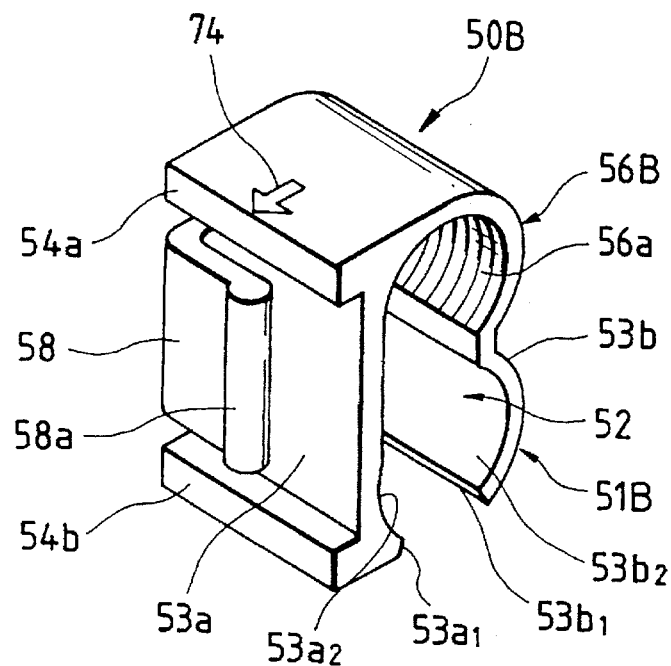
FIG. 13 is a perspective view showing a fourth embodiment of a tilt measuring device according to the present invention.
Figure 14:
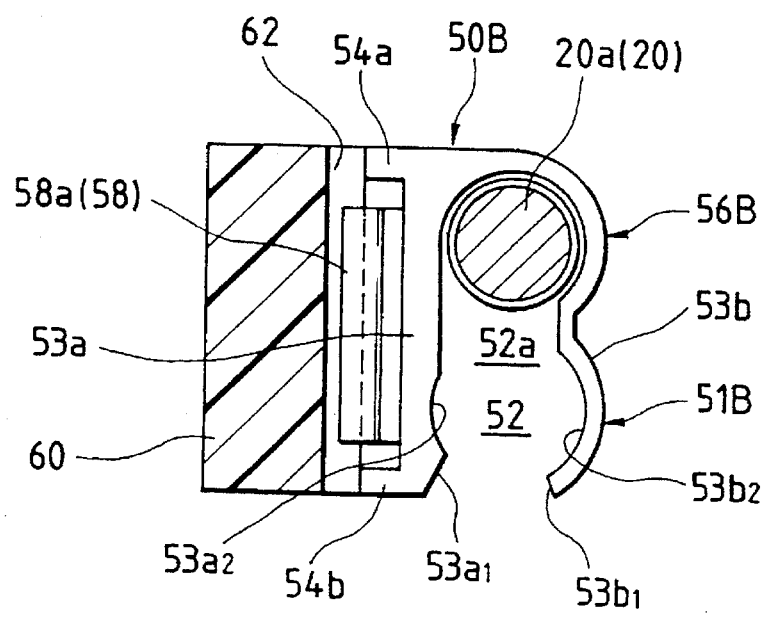
FIG. 14 is a front view showing the tilt measuring device of FIG. 13 illustrating the state in which the screw holding member holds the male threaded part (20a) of the aiming screw and the slide member is coupled to the aiming screw.
Figure 15:
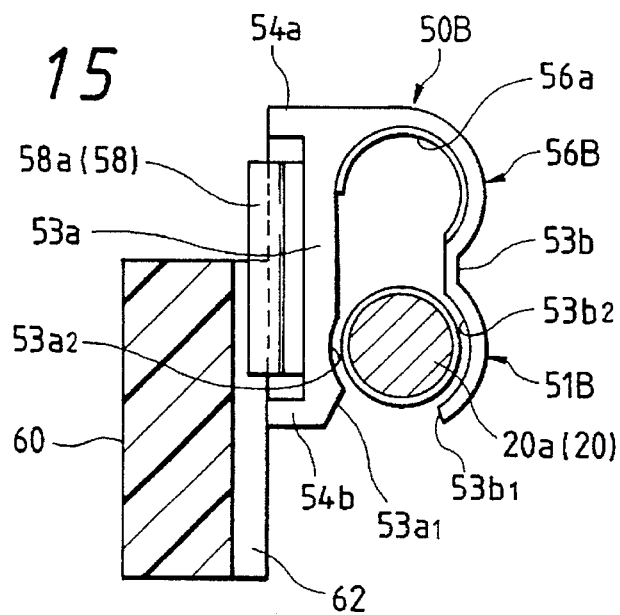
FIG. 15 is a front view showing the tilt measuring device of FIG. 13, the illustration showing the state where the screw holding member is disengaged from the male threaded part of the aiming screw and the coupling of the slide member with the aiming screw is released.

FIGS. 13 to 15 show a fourth embodiment of the present invention. Of these figures, FIG. 13 is a perspective view showing the fourth embodiment of a tilt measuring device according to the present invention. FIGS. 14 and 15 are front views of the tilt measuring device of FIG. 13. FIG. 14 illustrates the state where the screw holding member holds the male threaded part 20a of the aiming screws, and the slide member is coupled to the aiming screw. FIG. 15 illustrates the state where the screw holding member is disengaged from the male threaded part of the aiming screw, and the coupling of the slide member with the aiming screw is released.

In the constructions of the first to third embodiments, the screw holding member 56 (56A) may be turned about the hinge 55 relative to the slide member 51 (51A). In the tilt measuring device 50B of the fourth embodiment, a slide member 51B and a screw holding member 56B are formed on opposed inner sides 53a and 53b of a molded block (made of synthetic resin, such as nylon or ABS) opened downward to have a U-shape when viewed from the front, in the state where those members are vertically arrayed. Outward curved surfaces 53a2 and 53b2, which cooperate to form a circular hole 52, are formed close to the side walls 53a and 53b of the molded block of uniform thick. The inner diameter of the circular hole 52 is somewhat larger than the outer diameter of the male threaded part 20a of the aiming screw. The lower regions of the side walls where the outward curved surfaces 53a2 and 53b2 are formed define the slide member 51B. A female threaded part 56a is formed close to the upper sides of the side walls 53a and 53b (above the circular hole 52) while being spaced the width of a slightly narrowed path 52a from the circular hole 52 (FIG. 14). The inner diameter of the female threaded part 56a is slightly smaller than the outer diameter of the male threaded part 20a of the aiming screw. This region where the female threaded part 56a is formed defines the screw holding member 56B. The side walls 53a and 53b of the molded block, which define the slide member 51B and the screw holding member 56B, are elastically deformed so as to allow the male threaded part 20a of the aiming screw to be inserted into the slide member 51B, and to allow the male threaded part 20a to be inserted (moved from the slide member 51B into the screw holding member 56B and vice versa).

As shown in FIG. 14, in the state where the male threaded part 20a of the aiming screw engages the screw holding member 56B (the screw holding member 56B grasps the male threaded part 20a), the screw holding member 56B (slide member 51B) is coupled to the aiming screw 20. As shown in FIG. 15, the male threaded part 20a of the aiming screw is loosely coupled to the slide member 51B, and the coupling of the aiming screw 20 with the slide member 51B is released.

The remaining construction of the fourth embodiment is the same as in the first embodiment. Accordingly, like reference numerals are applied to like or equivalent portions and no further description thereof will be given.

Figure 16:
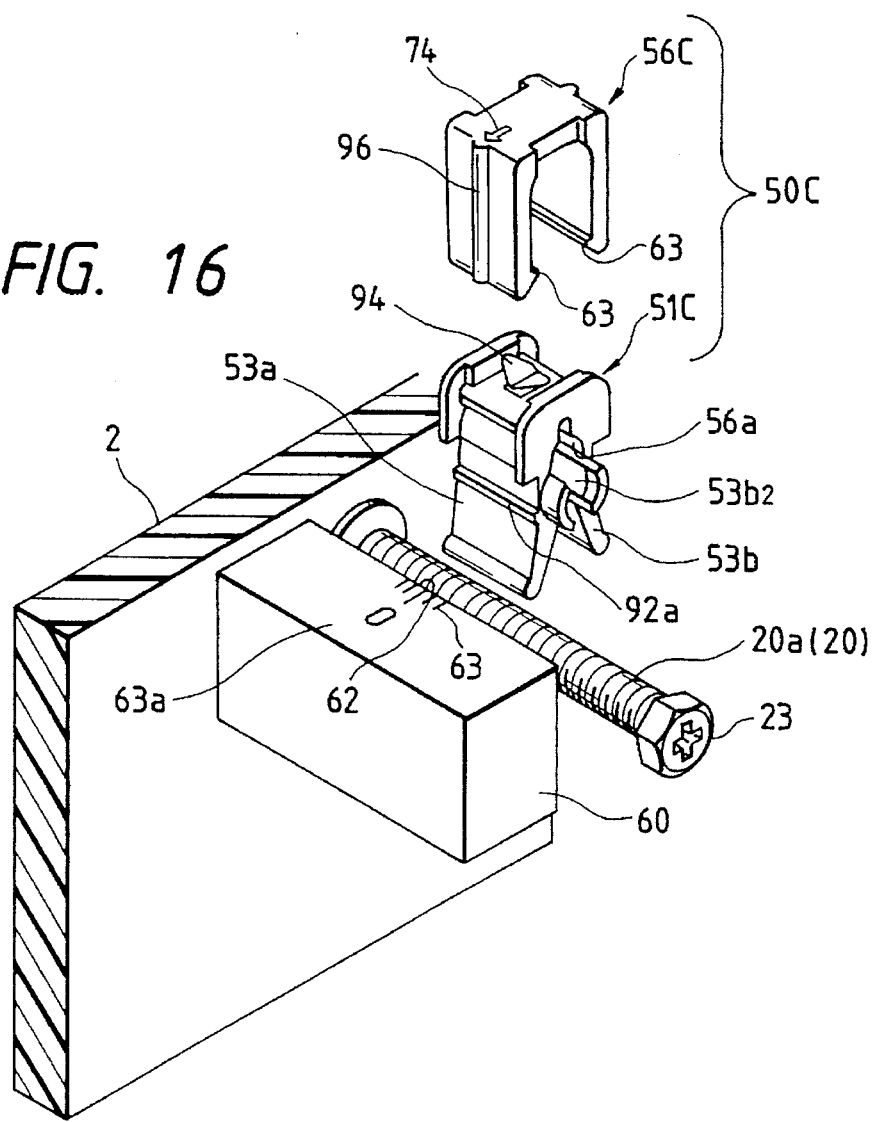
FIG. 16 is an exploded view, partly in cross section, of a tilt measuring device according to a fifth embodiment of the present invention.
Figure 17:
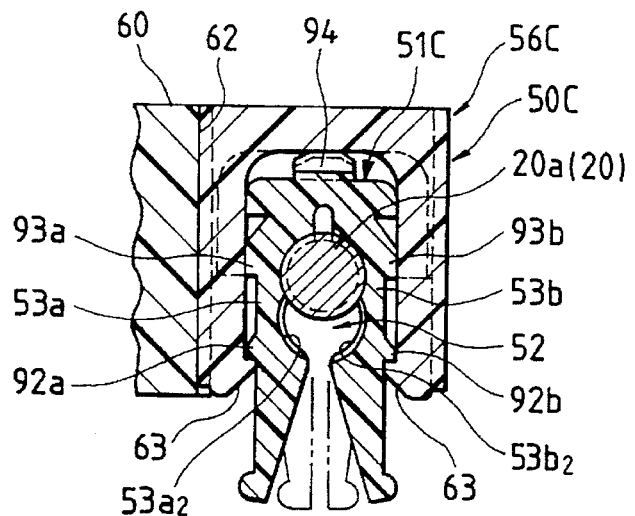
FIG. 17 is a transverse sectional view of the tilt measuring device of FIG. 16, the illustration showing a slide member coupled to an aiming screw.
Figure 19:
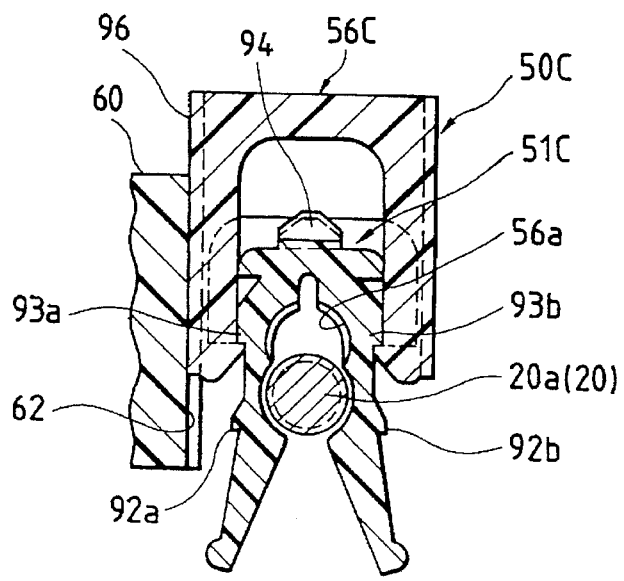
FIG. 19 is a transverse sectional view of the tilt measuring device of FIG. 16, the illustration showing the state where the coupling of the slide member with the aiming screw is completely released.

FIGS. 16 to 19 show a fifth embodiment of the present invention. Of these figures, FIG. 16 is an exploded view, partly in cross section, of a tilt measuring device according to the fifth embodiment of the present invention. FIGS. 17 to 19 are transverse sectional views of the tilt measuring device. Of these figures, FIG. 17 is a transverse sectional view of the tilt measuring device, the illustration showing a slide member coupled to an aiming screw. FIG. 18 is a transverse sectional view of the tilt measuring device, the illustration showing the state where the coupling of the slide member with the aiming screw is released. FIG. 19 is a transverse sectional view of the tilt measuring device, the illustration showing the state where the coupling of the slide member with the aiming screw is completely released.

In the tilt measuring device 50 (50A, 50B) of the first (second, third, fourth) embodiment, the slide member 51 (51A, 51B) and the screw holding member 56 (56A, 56B) are formed in a one-piece construction. When the screw holding member 56 (56A, 56B) directly grasps the male threaded part 20a of the aiming screw, the slide member 51 (51A, 51B) is coupled to the aiming screw 20.

In a tilt measuring device 50C of the fifth embodiment, a slide member 51C and a screw holding member 56C are constructed with different members. The screw holding member 56C elastically deforms a part of the slide member 51C, whereby it indirectly holds the male threaded part 20a of the aiming screw. In this way, the slide member 51C is coupled to the aiming screw 20.

The slide member 51C and the screw holding member 56C are made of synthetic resin, such as nylon or ABS. The slide member 51C is provided with a pair of side walls 53a and 53b, which are elastically deformable and opened outward or in such a direction that the side walls are spaced apart from each other. Outward curved surfaces 53a2 and 53b2 defining a circular hole 52, which receives the male threaded part 20a of the aiming screw, are formed on the opposite inner surfaces of the side walls 53a and 53b. A female threaded part 56a, which meshes with the male threaded part 20a of the aiming screw, is formed on the upper portions of the side walls 53a and 53b. In the state where the male threaded part 20a meshes with the female threaded part 56a, the U-shaped screw holding member 56C is applied to the slide member 51C from above, and grasps (clamps) the slide member 51C so as to make the side walls 53a and 53b approach each other. The female threaded part 56a meshes with the male threaded part 20a. As a result, the slide member 51C is coupled to the aiming screw 20.

Lower protrusions 92a and 92b and upper protrusions 93a and 93b, which are to be caught by pawls 63 and 63 formed on the inner sides of the lower ends of the legs of the screw holding member 56C, are formed on the outer sides of the side walls 53a and 53b. When the lower protrusions 92a and 92b are caught by the pawls 63 as shown in FIG. 17, the coupling of the slide member 51C to the aiming screw 20 is maintained. When the side walls 53a and 53b are bent inward by holding the lower ends thereof with the fingers, a protruding piece 94 such as a plate spring that protrudes upward from the top of the slide member 51C pushes the screw holding member 56C upward. Accordingly, the lower protrusions 92a and 92b disengage from the pawls 63.

Due to the righting moments of the side walls 53a and 53b that act to restore the side walls to their original state, i.e., the outward opened state, the pawls 63 come in contact with the upper protrusions 93a and 93b, thereby to disengage the female threaded part 56a from the male threaded part 20a. Further, when the screw holding member 56C is lifted up together with the slide member 51C, the male threaded part 20a of the aiming screw is inserted into the circular hole 52. In this state, the aiming screw 20 is completely decoupled from the slide member 51C.

In the above-described embodiments, the positioning member (resilient engaging plate 58) which is to engage the vertical groove 62 is formed in the slide member 51 (51A, 51B). In the present embodiment, a vertically elongated protrusion 96 is formed on the side wall of the screw holding member 56. By inserting the elongated protrusion 96 into the vertical groove 62 of the guide member 60, the cursor 74 marked on the screw holding member 56 is positioned at the zero point 63a. For the details of the aiming mechanism structure shown in FIGS. 16 to 19, reference is made to Published Unexamined Japanese Patent Application No. Hei. 5-253122.

In the above-mentioned embodiments, the guide member 60 is provided separately from the lamp body 2 and the lamp housing 2A. However, it may be formed integrally with the lamp body 2 and the lamp housing 2A.

Also in the above-described embodiments, a female threaded part 56a is used which is formed on the screw holding member 56 (56A, 56B) or the screw hold surface of the slide member 51C. However, if the force by which the screw hold surface holds the male threaded part 20a is sufficiently large, the female threaded part 56a may be omitted.

In the third embodiment (FIGS. 11 and 12), the location where the aiming screw 20 is held by the screw holding member is that of the male threaded part 20a. This location though may be replaced by the rear extended part 204 shown in FIGS. 24 to 26, which is rectangular in cross section and has no threaded part. Any other member may be used for the same purpose if it has a cross section shaped so as to be integrally coupled to the screw holding member.

The tilt measuring device for use with a headlamp for motor vehicles thus constructed has many advantages. The tilt measuring device requires a reduced number of parts, so that the construction of the device is simple, and the cost to manufacture is low. The tilt measuring device may easily be assembled to the headlamp with only two steps. In the first step the slide member is first coupled to the aiming screw, while in the second step the screw holding member is coupled to the headlamp. As a result, the screw holding member directly grasps the aiming screw. In an alternative second step, the screw holding member is coupled to the slide member. As a result, the screw holding member indirectly grasps the aiming screw.

The coupling of the slide member to the aiming screw can be released in a simple manner whereby the screw holding member is retracted to the side of the aiming screw. Following the removal of the coupling of the slide member with the aiming screw, the aiming adjustment is carried out. Then, the slide member is moved to the zero-point position on the scale, thereby causing the screw holding member to directly or indirectly grasp the aiming screw, i.e., interlocking the slide member with the aiming screw. Thus, the zero-point adjustment is very easy.

The tilt measuring device of the invention has following additional advantages.

In the state where the coupling of the slide member with the aiming screw is released, if the engagement of the concave/convex resilient stopper, which is provided between the slide member (or the screw holding member) and the guide member, is set up, the zero point is automatically indicated on the scale. In other words, no work for positioning the slide member for the zero-point adjustment is required. Additionally, the concave/convex resilient stopper urges the slide member to the zero-point position on the scale. Because of this, the setting of the indication to the zero point on the scale is maintained even after an aiming adjustment is carried out. Accordingly, no zero-point adjustment need follow an aiming adjustment if the zero-point adjustment has previously been made.

Figure 20:
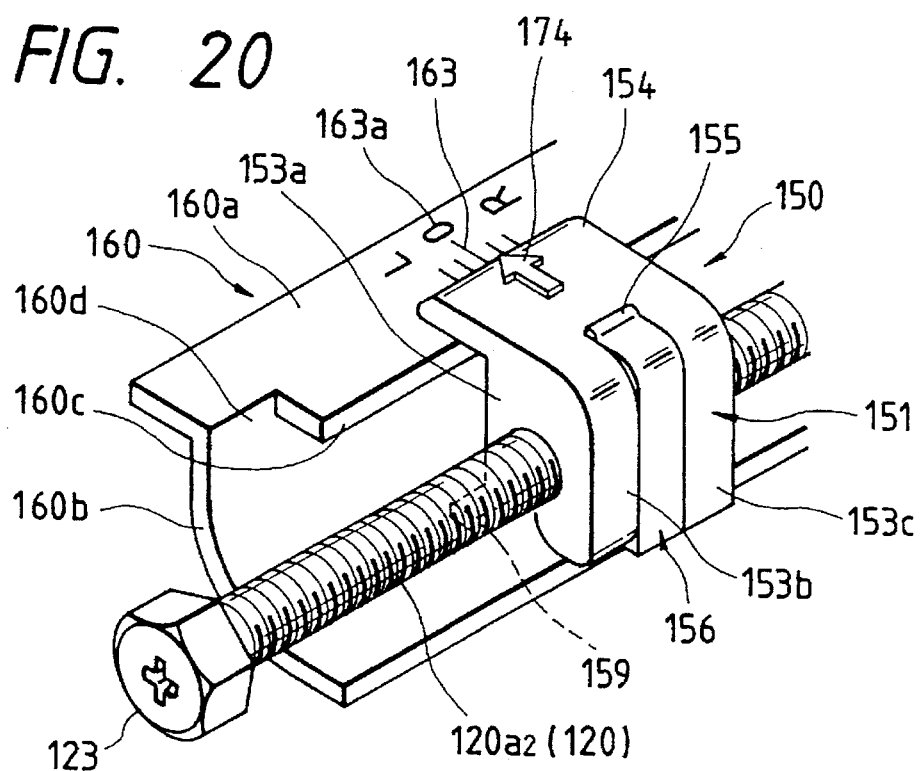
FIGS. 20 and 21 are perspective views showing a tilt measuring device for measuring the amount of inclination of a light beam emitted by the headlamp in the horizontal direction constructed in accordance with a sixth embodiment of the invention.
Figure 21:
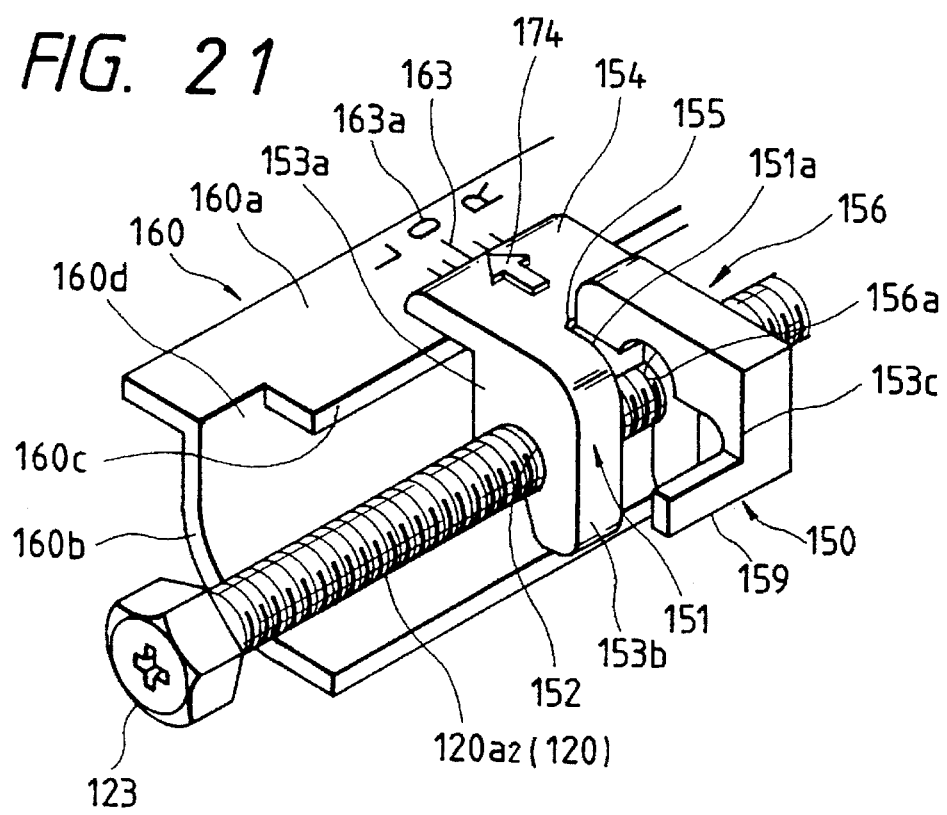
Figure 22:
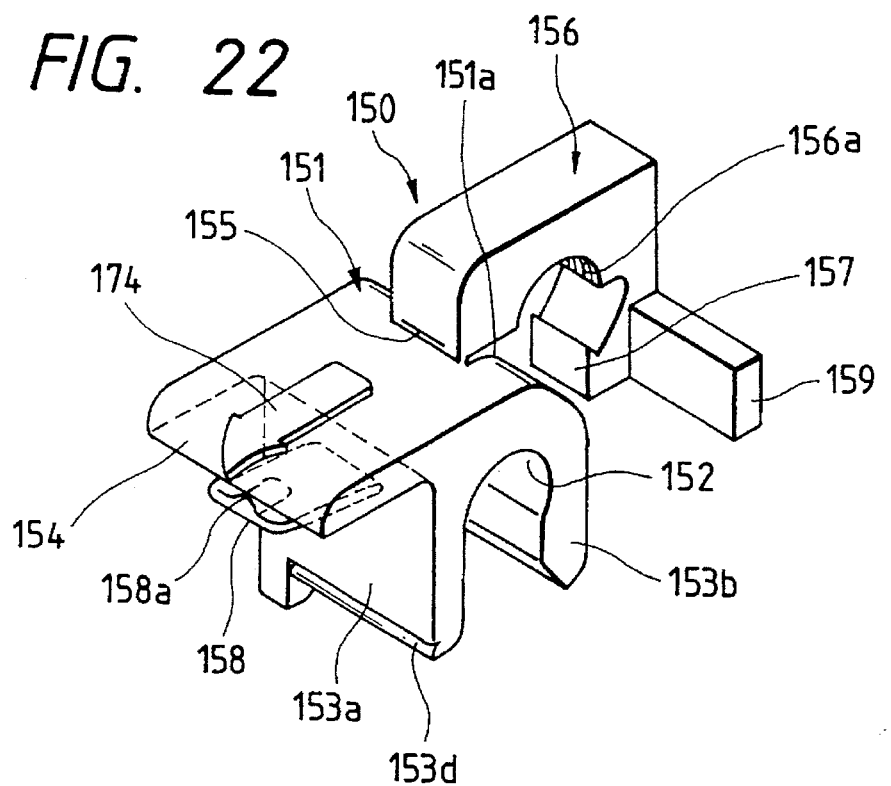
FIG. 22 is a perspective view of a slide member used in the tilt measuring device of FIGS. 20 and 21.

A sixth embodiment will be described with reference to FIGS. 20 through 25. FIGS. 20 and 21 are perspective views showing a tilt measuring device for measuring the amount of inclination of a light beam emitted by the headlamp in the horizontal direction. FIG. 22 is a perspective view of a slide member used in the tilt measuring device of FIGS. 20 and 21.

Figure 23:
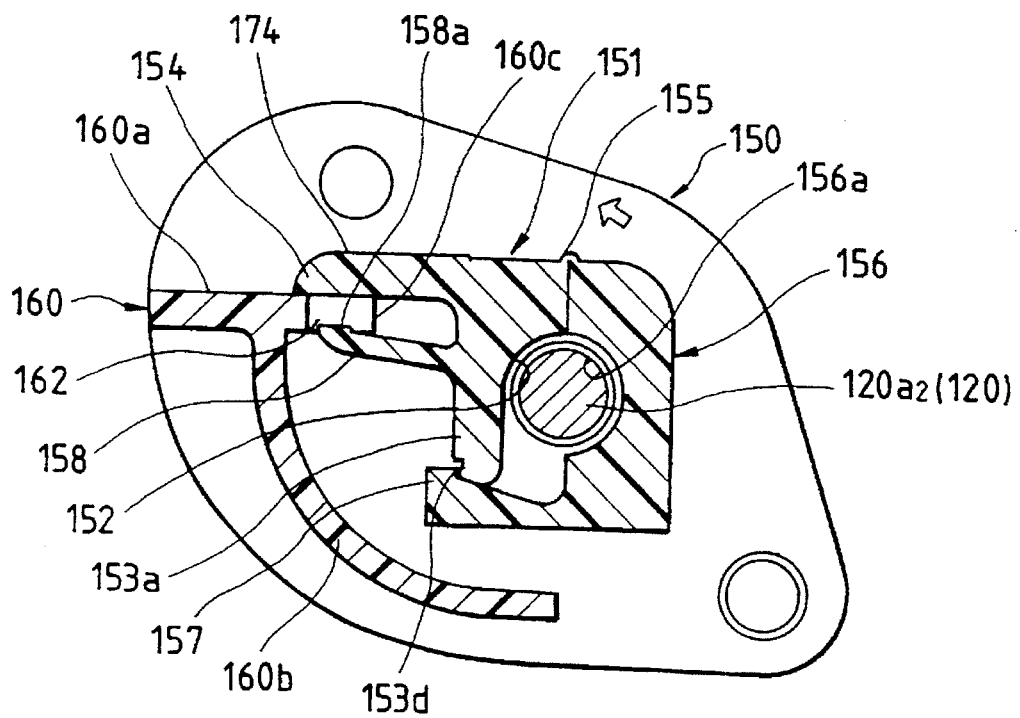
Figure 24:
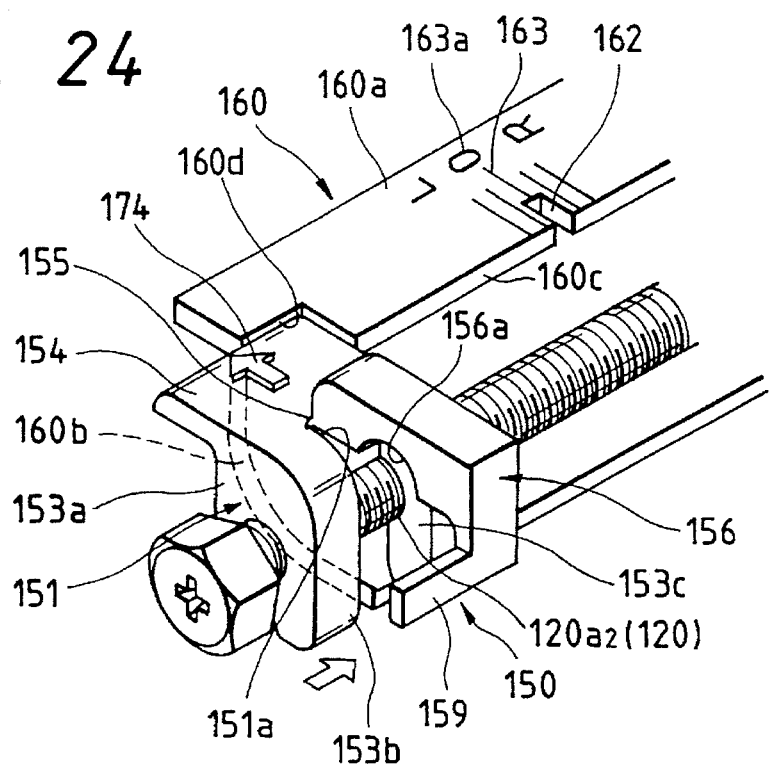
Figure 25:
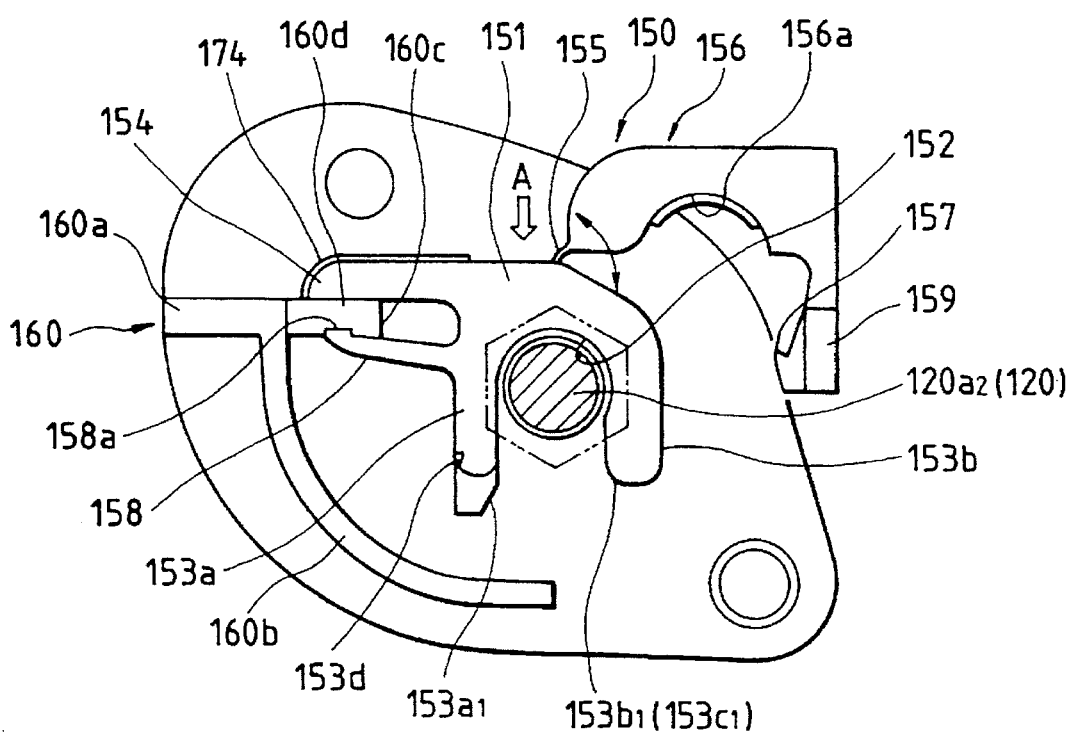
FIG. 25 is a perspective view showing a state of assembling the sixth embodiment of a tilt measuring device to a headlamp.

Of FIGS. 23 and 24 showing front views of the tilt measuring device, FIG. 23 is a view showing a slide member is coupled to an aiming screw when a screw holding member holds a male threaded part of the aiming screw, and FIG. 24 is a view showing the state where the screw holding member disengages from the male threaded part, and the slide member is decoupled from the aiming screw. FIG. 25 is a perspective view showing a state of assembling the tilt measuring device into the headlamp.

In FIGS. 20 through 25, reference numeral $120a_2$ indicates a male threaded part of a right-handed screw having two threads. The male threaded part $120a_2$ is formed on the rearward protruding portion of the aiming screw 120, which protrudes rearward from the lamp body 2. A guide member 160, shaped like a "T" in cross section, is fastened to the rear wall of the lamp body 2 extending parallel to the male threaded part $120a_2$. A linear scale 163 is formed on the upper surface of a cross bar part 160a of the T shape of the guide member 160. A vertical bar part 160b of the T shape of the guide member 160 is curved toward the aiming screw 120. With the curved vertical bar part 160b, the rigidity of the guide member 160 is improved. A first measuring device 150 for measuring the amount of horizontal tilt of the reflector 4, i.e., the horizontal tilt of the beam angle of the headlamp, is located between the male threaded part $120a_2$ of the aiming screw and the guide member 160.

The first measuring device 150 is composed of a slide member 151, a screw holding member 156, and a relative scale (a cursor 174 and a linear scale 163). The slide member 151, shaped like an "L" in plan and like a "U" in a front view, has a cutout which is brought into contact with a side edge 160c of the guide member 160, thereby preventing turning of the slide member. Further, the slide member 151 is loosely coupled to the male threaded part $120a_2$ of the aiming screw, and slidable with respect to the guide member 160. The screw holding member 156, rectangular in shape, includes a female threaded part 156a which meshes with the male threaded part $120a_2$. The screw holding member 156 is integrally coupled at the location of a cutout 151a of the slide member 151 with the thin hinge 155 coming therebetween. The relative scale is provided-between the slide member 151 and the guide member 160. In the state where the female threaded part 156a of the screw holding member 156 receives the male threaded part $120a_2$ of the aiming screws, the amount of horizontal tilting of the reflector 4 (the amount of tilting of the reflector 4 about vertical axis Ly) is indicated in the form of a quantity of movement of the cursor 174 along the slide member 151. When the cursor 174 is previously set to a zero point 163a on the linear scale 163 in a zero-point adjustment, the indication by the cursor 174 on the scale represents the amount of horizontal tilt of the reflector 4.

The slide member 151 and the screw holding member 156 are formed by molding synthetic resin, such as nylon or ABS, in a one-piece construction. The slide member 151 and the screw holding member 156 may be turned about the thin hinge 155, which interconnects the members 151 and 156 (indicated by an arrow in FIG. 24). A hole 152, part circular in cross section and opening downward, is formed between the opposed side walls 153a, 153b, and 153c (FIG. 24) of the slide member 151. The diameter of the circular hole 152 is larger than the diameter of the aiming screw male threaded part $120a_2$. The circular hole 152 has a downward opening of which the width is somewhat smaller than the outer diameter of the circular hole 152. Through the opening, the male threaded part 120$a_2$ of the aiming screw is introduced into the circular hole 152.

In order to provide a space for coupling the first measuring device 150 with the aiming screw 120, a cutout 160$d$ is formed in the protruding part of the side edge 160$c$ of the guide member 160. Through the cutout 160$d$, the first measuring device 150 may be coupled to the aiming screw 120 from above. To be more specific, to introduce the male threaded part male threaded part 120$a_2$ into the circular hole 152, slanted faces 153$a$1, 153$b$1, and 153$c$1 (FIG. 24) occupying the lower parts of the side walls 153$a$, 153$b$, and 153$c$ are brought into contact with the male threaded part 120$a_2$ of the aiming screw. Then, the slide member 151 is pressed against the male threaded part 120$a_2$ of the aiming screw (in the direction of an arrow A in FIG. 24). As a result, the side walls 153$a$, 153$b$, and 153$c$ are elastically moved outward so that the male threaded part 120$a_2$ of the aiming screw is loosely received in the circular hole 152. FIGS. 24 and 25 illustrate the state where the slide member 151 is coupled to the male threaded part 120$a_2$ of the aiming screw. A pair of upper and lower horizontal guides 154 and 158 extend outward from the side wall 153$a$ of the slide member 151, which is located closer to the guide member 160. The side edge 160$c$ of the guide member 160 is inserted between the upper and lower horizontal guides 154 and 158, so that the slide member 151 is prevented from being turned. Therefore, in the state where the side edge 160$c$ of the guide member 160 is inserted between the upper and lower horizontal guides 154 and 158, the slide member 151 is slidable along the guide member 160 while it is loosely coupled to the male threaded part 120$a_2$.

The screw holding member 156 is shaped so as to fit into the cutout 151$a$ of the slide member 151. The female threaded part 156$a$ of the screw holding member 156 is formed at a location thereof in opposition to the circular hole 152 in the side wall 153$a$ of the screw holding member 156. A resilient hook 157 is formed at the lower end of the screw holding member 156. The resilient hook 157 engages an inward curved part 153$d$ of the lower end of the side wall 153$a$ of the slide member 151. When the resilient hook 157 is inserted into the inward curved part 153$d$, the screw holding member 156 holds the male threaded part 120$a_2$ of the aiming screw. In this state, the female threaded part 156$a$ of the screw holding member 156 meshes with the male threaded part 120$a_2$ of the aiming screw. To be more specific, in the state where the resilient hook 157 is inserted into the inward curved part 153$d$ and the screw holding member 156 grasps the male threaded part 120$a_2$ (the female threaded part 156$a$ of the screw holding member 156 is in mesh with the male threaded part 120$a_2$), the horizontal guides 154 and 158 contact the side edge 160$c$ of the guide member 160, thereby to prevent the turning of the slide member 151. Under this condition, the slide member 151 slides a distance corresponding to the amount of turning of the horizontal aiming screw 120 along the guide member 160 in association with the turn of the horizontal aiming screw 120.

The lower horizontal guide 158 is a resilient engaging plate, which is narrower and thinner than the upper horizontal guide 154. In the state where the male threaded part 120$a_2$ of the aiming screw is loosely coupled to the circular hole 152 of the slide member 151, the upper horizontal guide 154 and the lower horizontal guide (resilient engaging plate) 158 sandwiches the side edge part 160$a$ of the guide member 160. An expanded tip 158$a$ of the resilient engaging plate 158 is to be received in a cutout 162 formed in the side edge 160$c$ of the guide member 160. At the position where the expanded tip 158$a$ is inserted into the cutout 162, the cursor 174 is urged to indicate the zero point 163$a$ on the scale. By inserting the expanded tip 158$a$ in the cutout 162, the slide member 151 is temporarily held at this position, i.e., the zero point on the scale. Reference numeral 159 designates a knob protruding forward of the front end of the screw holding member 156. The knob 159 is used for manually operating the screw holding member 156.

An initial stress acting to turn the screw holding member 56 counterclockwise in FIG. 23 (in the direction of an arrow) exists in the thin hinge 155. In molding the slide member 151 and the screw holding member 156 in a one-piece construction, the thin hinge 155 is molded in a straightened state as indicated by a solid line in FIG. 24. When the resilient hook 157 (FIG. 7) grasps the inward curved part 153$d$, the thin hinge 155 is bent, and hence a stress tending to restore the bent thin hinge to its original state is generated therein. When the resilient hook 157 disengages from the inward curved part 153$d$, the screw holding member 56 is turned about the thin hinge 155 by the righting moment, so that the screw holding member 156 is placed in a sprung-up state, as shown in FIG. 24. Accordingly, the screw holding member 156 can easily be disengaged from the male threaded part 120$a_2$ of the aiming screw (the coupling of the slide member 151 with the horizontal aiming screw 120 is released) in a manner such that the resilient hook 157 is disengaged from the inward curved part 154$c$ by manually moving the knob 159, or with the use of a tool for turning the aiming screw, such as a screwdriver.

The aiming adjustment and the zero-point adjustment of the first tilt measuring device 150 are carried out in the following manner.

The state shown in FIGS. 20 and 23, in which the screw holding member 156 is in mesh with the aiming screw male threaded part 120$a_2$, the cross bar part 160$a$ of the guide member 160 is disposed between the upper and lower horizontal guides 154 and 158 thereby preventing the turning of the slide member 151, and the slide member 151 interlocks with the aiming screw 120, is changed to the state shown in FIG. 21, in which the screw holding member 156 is in a sprung-up state. Then, the slide member 151 is disengaged from the male threaded part 120$a_2$ of the aiming screw. Subsequently, the slide member 151 (and the screw holding member 156) is slid along the guide member 160, thereby to engage the expanded tip 158$a$ of the resilient engaging plate 158 with the cutout 162. Then, the cursor 174 is automatically set to the zero point 163$a$. In this way the zero-point adjustment is carried out.

Following the zero-point adjustment, an aiming adjustment is carried out by turning the horizontal aiming screw 120. In this case, the turning of the horizontal aiming screw 120 has little influence on the slide member 151 because the slide member 151 is not coupled to the horizontal aiming screw 120. By installing the lower horizontal guide (resilient engaging plate) 158 as a concave/convex resilient stopper in the cutout 162, the slide member 151 is fixedly set at the zero point on the scale (where the cursor 174 indicates the zero point 163$a$). Therefore, the aiming adjustment can be carried out while maintaining the state of the zero-point adjustment already set up.

Let us consider a case where the male threaded part 120$a_2$ of the fore end of the aiming screw 120 is a left-handed screw of one thread, the male threaded part 120$a_2$ of the rear end of the aiming screw 120 is a right-handed screw of one or two threads, and the optical axis L is tilted to the left as seen by the driver. In this case, the aiming screw 120 has been turned clockwise when seen from the driver, and the nut 121 has advanced. At this time, the cursor 174 of the first measuring device 150 indicates a scale mark deviated to the left side from the zero point 163*a* on the scale of the guide member 160. This scale mark indicates the amount of tilting of the optical axis L to the left.

To couple the first tilt measuring device 50 to the aiming screw 120, the slide member 151 is applied to (loosely coupled to) the aiming screw male threaded part 120*a*$_2$ from above the male threaded part 120*a*$_2$ at the location of the cutout 160*d* of the protruding part of the guide member 160, as shown in FIG. 25. More exactly, in the state where the opening side of the slide member 151 faces downward while the screw holding member 156 is in a sprung-up state, the male threaded part 120*a*$_2$ of the aiming screw is inserted into the circular hole 152 along the slanted faces 153*a*1, 153*b*1, and 153*c*1 for aiming screw introduction. In this way, the male threaded part 120*a*$_2$ of the aiming screw is loosely coupled to circular hole 152. Subsequently, the side edge 160*c* of the guide member 160 is positioned at a location between the upper and lower horizontal guides 154 and 158, and the slide member 151 is pushed along the guide member 160, as indicated by an arrow in FIG. 25, thereby entering the side edge 160*c* a space between the upper and lower horizontal guides 154 and 158. Further, the slide member 151 is slid along the guide member 160, thereby to engage the expanded tip 158*a* of the resilient engaging plate 158 as the lower horizontal guide with the cutout 162 of the guide member 160. Then, the slide member 151 is automatically set and held at the position where the zero-point adjustment has been made.

Figure 26:
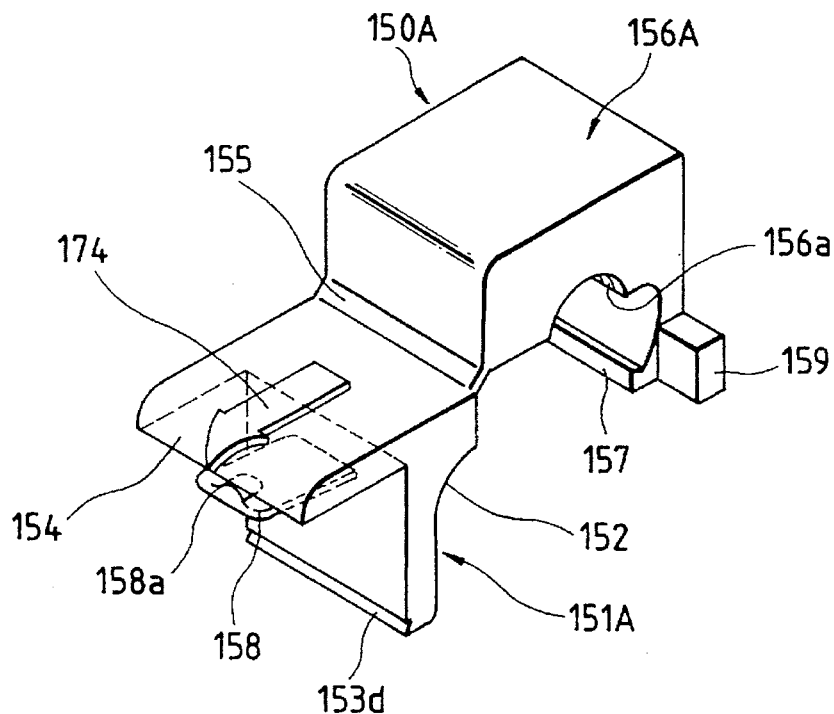
FIG. 26 is a perspective view showing a tilt measuring device according to a seventh embodiment of the present invention.
Figure 27:
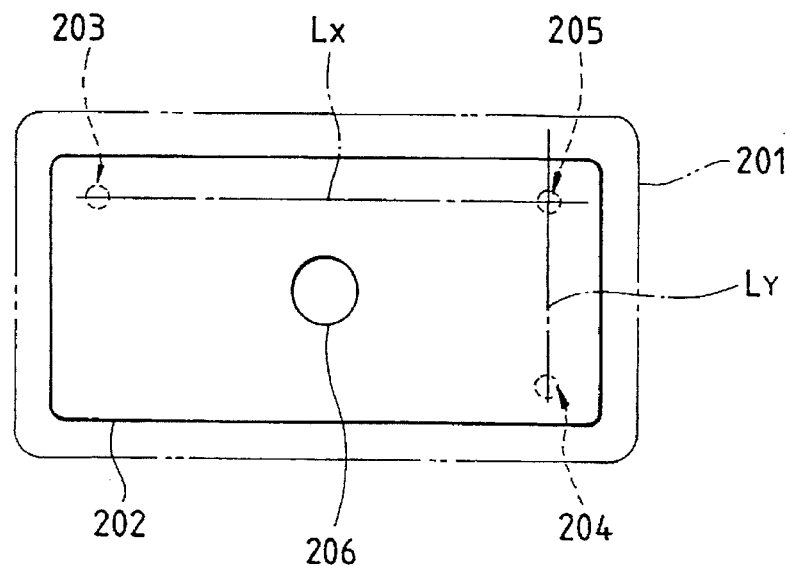
FIG. 27 is a front view showing a conventional headlamp.
Figure 28:
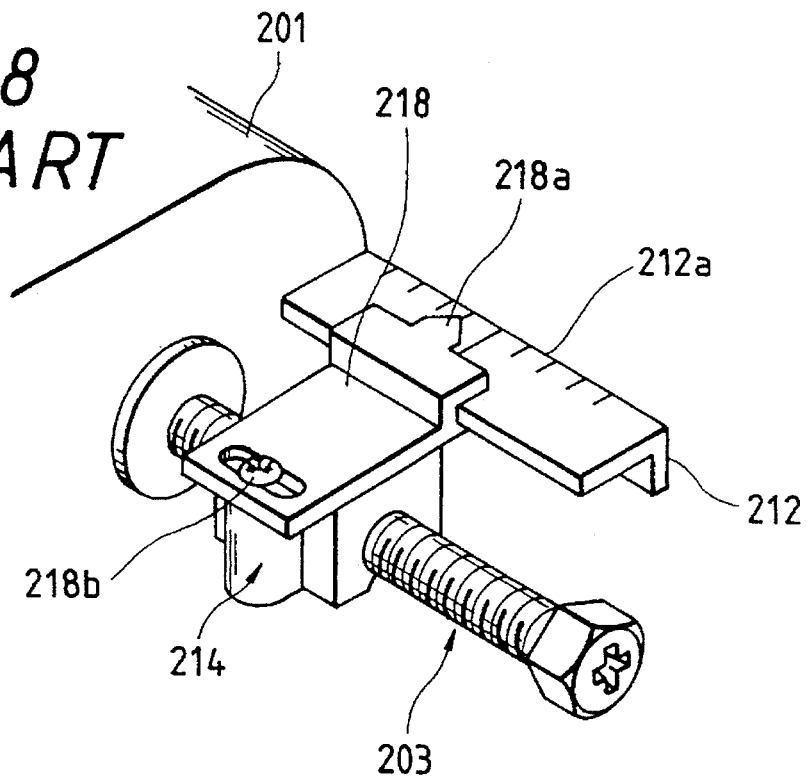
FIG. 28 is a perspective view showing a first example of a conventional tilt measuring device.
Figure 29:
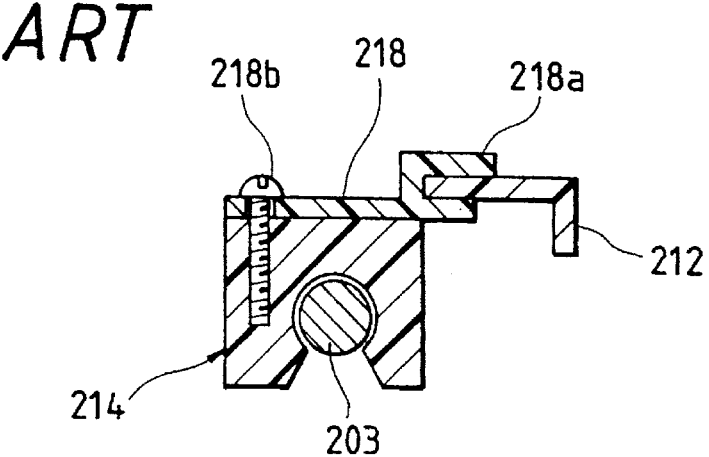
FIG. 29 is a transverse sectional view showing the tilt measuring device of FIG. 28.
Figure 30:
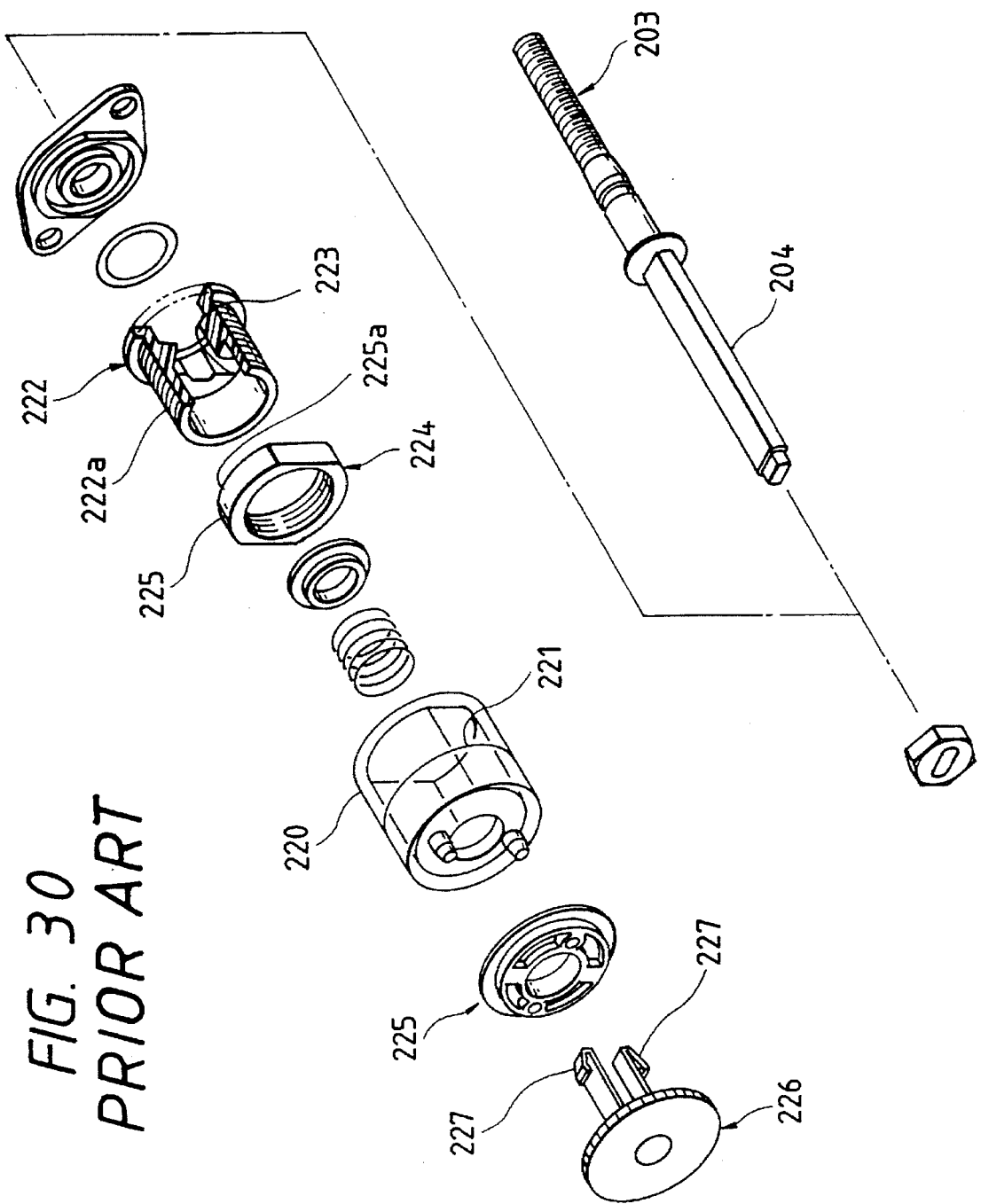
FIG. 30 is an exploded view showing a second example of a conventional tilt measuring device.
Figure 31:
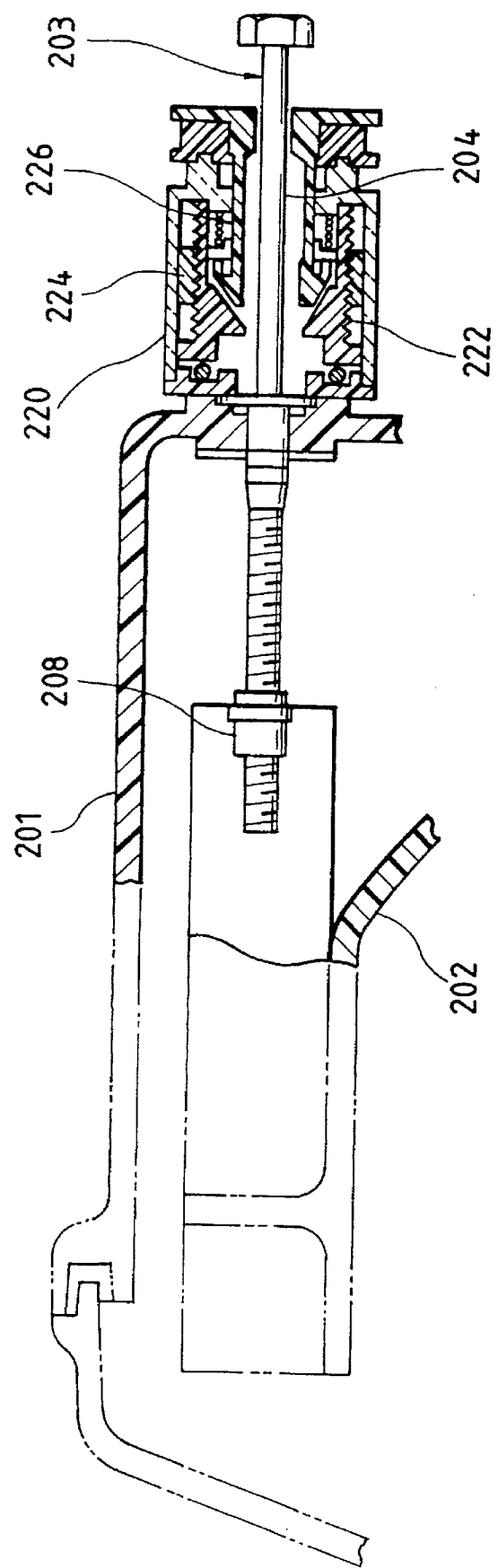
FIG. 31 is a longitudinal sectional view showing the tilt measuring device of FIG. 30.
Figure 32:
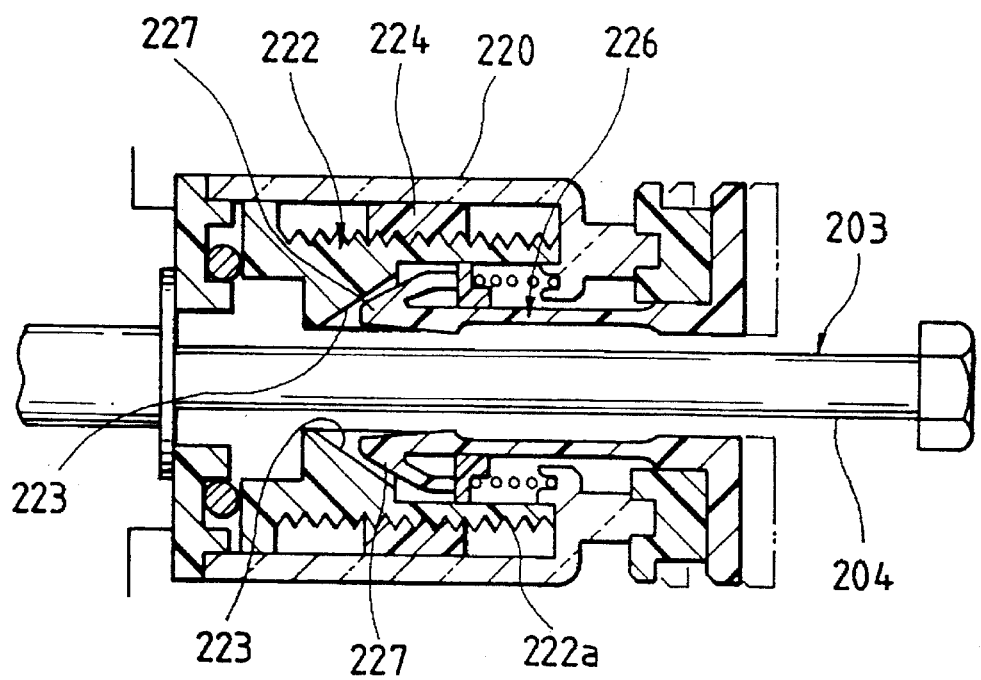
FIG. 32 is a longitudinal sectional view of the tilt measuring device of FIG. 29, the illustration showing the state where the coupling of a base member with an aiming screw is released.
Figure 33:
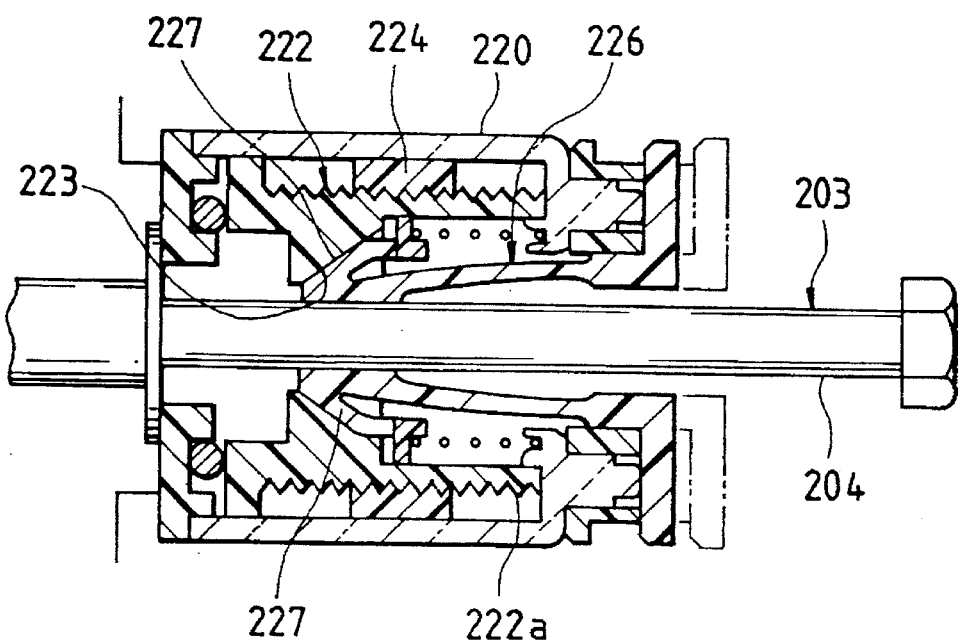
FIG. 33 is a longitudinal sectional view of the tilt measuring device of FIG. 29, the illustration showing the state where the base member is coupled to the aiming screw.

FIG. 26 is a perspective view showing a tilt measuring device according to a seventh embodiment of the present invention.

In the tilt measuring device 150 of the sixth embodiment, approximately one-fourth of the U-shaped block is separately formed. This one-fourth portion is used for the screw holding member 156. In the tilt measuring device 150A of the seventh embodiment, the U-shaped block is longitudinally divided into two sub-blocks along the circular hole. These divided sub-blocks are used for a slide member 151A with a smooth circular hole 152 and a screw holding member 156A with a female threaded part 156*a*.

The remaining construction of the seventh embodiment is substantially the same as that of the first embodiment. Hence, no further description of it will be given, noting that like reference numerals in the drawings designate like or equivalent portions.

In the above-described embodiment, the cutout 62 of the side edge 160*c* of the guide member 160 and the expanded tip 158*a* of the resilient engaging plate 158 as the lower horizontal guide form the concave/convex resilient stopper. This stopper may also be constructed as described below. That is, the lower horizontal guide 158 is constructed to be wider and thicker than the upper horizontal guide 154. The upper horizontal guide 154 is used as the resilient engaging plate. In this case, the expanded part of the upper horizontal guide 154 and the cutout 162 of the guide member 160 form the concave/convex resilient stopper.

In another modification, a cutout or an inward curved part is formed in the upper horizontal guide 154 or lower horizontal guide 158. An expanded part to be coupled to the cutout or the inward curved part is formed at a location of the side edge 160*c* of the guide member 160 where it slidably contacts the upper horizontal guide 154 or the lower horizontal guide 158. Thus, the concave/convex resilient stopper may be realized in a manner such that a convex part is formed in one of the horizontal guide 154 (or 158) and the side edge 160*c* of the guide member 160, while a concave part for receiving the convex part is formed in the other.

In the state where the coupling of the slide member with the aiming screw is released, if the engagement of the concave/convex resilient stopper, which is provided between the slide member and the guide member, is established, the cursor automatically indicates the zero point on the scale. In other words, no positioning work of the slide member for the zero-point adjustment is required. Additionally, the concave/convex resilient stopper urges the slide member to the zero-point position on the scale. Because of this, the setting of the indication to the zero point on the scale is maintained even if the aiming the aiming adjustment is carried out. Accordingly, no zero-point adjustment need follow the aiming adjustment if the zero-point adjustment has been previously made.

The resilient urging force provided by the concave/convex resilient stopper between the slide member and the guide member acts only in the direction to hold the side edge of the slide member, and does not act in the direction to separate the guide member from the aiming screw. When the resilient urging force provided by the concave/convex resilient stopper acts in the direction to separate the slide member from the guide member, the aiming screw is urged to separate from the guide member. There may be a concern that the stopping of the turning of the slide portion is insufficient. In the present invention, however, the resilient urging force by the concave/convex resilient stopper acts on the guide member and the slide member, and does not act on the aiming screw. Accordingly, no play such as would deteriorate the function of stopping the turning of the slide member is not created, thereby ensuring long use of the measuring device.

What is claimed is:

1. An automotive headlamp having a tilt measuring device in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said aiming screw;

a slide member loosely coupled to said aiming screw and slidable in a direction in which said guide member extends while being guided by said guide member;

a screw holding member having a first condition comprising a member-closed position and a second condition comprising a member-open position, wherein in said first condition said screw holding member grasps said aiming screw in proximity to said slide member and couples said aiming screw to said slide member such that said screw holding member and said slide member follow longitudinal movement of said aiming screw to adjust said aiming angle while being guided by said guide member, and in said second condition said screw holding member releases engagement of said aiming screw; and a cursor provided on one of said slide member and said screw holding member, and a relative scale provided on said guide member, an amount of deviation of said tilt angle from a desired angle being indicated by said cursor on said relative scale.

2. An automotive headlamp having a tilt measuring device in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said aiming screw;

a slide member loosely coupled to said aiming screw and slidable in a direction in which said guide member extends while being guided by said guide member;

a screw holding member having a closed position and an open position, wherein in said closed position said screw holding member grasps said aiming screw in proximity to said slide member and couples said aiming screw to said slide member such that said screw holding member and said slide member follow longitudinal movement of said aiming screw to adjust said aiming angle while being guided by said guide member, and in said open position releasing engagement of said aiming screw; and a cursor provided on one of said slide member and said screw holding member, and a relative scale provided on said guide member, an amount of deviation of said tilt angle from a desired angle being indicated by said cursor on said relative scale said tilt measuring device further comprising resilient stopper means provided between said slide member and said guide member, wherein when a state of coupling of said slide member and said aiming screw is released upon movement of said screw holding member from said closed position to said open position, said resilient stopper means temporarily holds said slide member at a predetermined position in a sliding direction where a zero point on said relative scale is indicated, and when said slide member is coupled to said aiming screw in said closed position of said screw holding member, said, resilient stopper means allows said slide member to slide along said guide member when said aiming screw moves.

3. An automotive headlamp having a tilt measuring device in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said aiming screw;

a slide member loosely coupled to said aiming screw and slidable in a direction in which said guide member extends while being guided by said guide member;

a screw holding member having a closed position and an open position, wherein in said closed position said screw holding member grasps said aiming screw in proximity to said slide member and couples said aiming screw to said slide member such that said screw holding member and said slide member follow longitudinal movement of said aiming screw to adjust said aiming angle while being guided by said guide member, and in said open position releasing engagement of said aiming screw; and a cursor provided on one of said slide member and said screw holding member, and a relative scale provided on said guide member, an amount of deviation of said tilt angle from a desired angle being indicated by said cursor on said relative scale said tilt measuring device further comprising concave/convex resilient stopper means provided between said screw holding member and said guide member, wherein when a state of coupling of said slide member and said aiming screw is released upon movement of said screw holding member from said closed position to said open position, said concave/convex resilient stopper means temporarily holds said slide member at a predetermined position in a sliding direction where a zero point on said relative scale is indicated, and when said slide member is coupled to said aiming screw in said closed position of said screw holding member, said concave/convex resilient stopper means allows said slide member to slide along said guide member when said aiming screw moves.

4. An automotive headlamp having a tilt measuring device in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said aiming screw;

a slide member loosely coupled to said aiming screw and slidable in a direction in which said guide member extends while being guided by said guide member;

a screw holding member having a closed position and an open position, wherein in said closed position said screw holding member grasps said aiming screw in proximity to said slide member and couples said aiming screw to said slide member such that said screw holding member and said slide member follow longitudinal movement of said aiming screw to adjust said aiming angle while being guided by said guide member, and in said open position releasing engagement of said aiming screw; and a cursor provided on one of said slide member and said screw holding member, and a relative scale provided on said guide member, an amount of deviation of said tilt angle from a desired angle being indicated by said cursor on said relative scale wherein said slide member and said screw holding member are integrally molded with one another.

5. An automotive headlamp having a tilt measuring device in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said aiming screw;

a slide member loosely coupled to said aiming screw and slidable in a direction in which said guide member extends while being guided-by said guide member, said slide member having a partly circular hole formed therein of a diameter slightly larger than an outside diameter of said aiming screw, said partly circular hole opening on one side of said slide member so that said slide member can be placed on said aiming screw;

a screw holding member coupled to said slide member through a flexible hinge, said screw holding member having a closed position and an open position, wherein in said closed position said screw holding member grasps said aiming screw in proximity to said slide member such that said screw holding member and said slide member follow longitudinal movement of said aiming screw to adjust said aiming angle while being guided by said guide member, and in said open position releasing engagement of said aiming screw; and a cursor provided on one of said slide member and said screw holding member, and a relative scale provided on said guide member, an amount of deviation of said tilt angle from a desired angle being indicated by said cursor on said relative scale.

6. The automotive headlamp of claim 5, wherein said guide member has a groove formed therein extending orthogonal to a longitudinal axis of said aiming screw, and wherein said slide member comprises a resilient engaging plate formed on a side wall thereof adjacent said guide member, said resilient engaging plate having an expanded tip portion receivable in said groove at a relative position of said slide member and said groove where said cursor indicates a zero point on said relative scale.

7. The automotive headlamp of claim 6, wherein said resilient engaging plate is shaped like a plate spring extending from said side wall of said slide member extending generally parallel to said wall.

8. The automotive headlamp of claim 5, wherein said slide member is generally U-shaped in a front view and generally L-shaped in plan view.

9. The automotive headlamp of claim 5, wherein said screw holding member has a resilient hook portion engageable with an inward curved portion of said slide member.

10. The automotive headlamp of claim 5, wherein said screw holding member has a female threaded portion engageable with a male thread of said aiming screw in said closed position.

11. The automotive headlamp of claim 5, wherein said slide member and said screw holding member are integrally molded with one another from a synthetic resin such that said screw holding member is biased toward said open position.

12. A tilt measuring device for an automotive headlamp in which a tiltable member having a reflecting surface defining an aiming direction of a light beam from the headlamp is supported at three points by a pivot point provided between the tiltable member and a base member, a horizontal aiming screw, and a vertical aiming screw, whereby the tiltable member is tilted vertically and horizontally with respect to the base member by longitudinal movement of the aiming screws to adjust the aiming angle of the headlamp, said tilt measuring device comprising:

a guide member provided on said base member, said guide member extending substantially parallel to said horizontal aiming screw;

a slide member mounted on said horizontal aiming screw;

a screw holding member having a first condition in which said screw holding member is engaged with said slide member and a second condition in which said screw holding member is disengaged from said slide member, said slide member being loosely coupled to said horizontal aiming screw and mounted on said horizontal aiming screw when said screw holding member is disengaged from said slide member so as to be slidable in a direction in which said guide member extends while being guided by said guide member, and said slide member being mounted on and operatively coupled to said horizontal aiming screw such that said screw holding member and said slide member follow longitudinal movement of said horizontal aiming screw to adjust said aiming angle while being guided by said guide member when said holding member is engaged with said slide member; and a cursor provided on one of said slide member and said screw holding member, and a relative scale provided on said guide member an amount of deviation of said tilt angle from a desired angle being indicated by said cursor on said relative scale.

* * * * *